United States Patent
Jiang et al.

(10) Patent No.: US 12,376,095 B2
(45) Date of Patent: Jul. 29, 2025

(54) METHOD AND DEVICE USED IN WIRELESS COMMUNICATION NODE

(71) Applicant: BUNKER HILL TECHNOLOGIES LLC, Allen, TX (US)

(72) Inventors: Qi Jiang, Shanghai (CN); Xiaobo Zhang, Shanghai (CN); Lin Yang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 945 days.

(21) Appl. No.: 17/088,589

(22) Filed: Nov. 4, 2020

(65) Prior Publication Data

US 2021/0051643 A1  Feb. 18, 2021

Related U.S. Application Data

(63) Continuation of application No. PCT/CN2019/104047, filed on Sep. 2, 2019.

(30) Foreign Application Priority Data

Sep. 18, 2018 (CN) .......................... 201811092849.0

(51) Int. Cl.
*H04W 72/044* (2023.01)
*H04B 7/0426* (2017.01)
(Continued)

(52) U.S. Cl.
CPC ........ *H04W 72/046* (2013.01); *H04B 7/0426* (2013.01); *H04B 17/309* (2015.01); *H04L 5/0053* (2013.01); *H04W 72/542* (2023.01)

(58) Field of Classification Search
CPC ............ H04W 52/242; H04W 72/046; H04W 72/542; H04W 74/0833; H04B 7/0426;
(Continued)

(56) References Cited

U.S. PATENT DOCUMENTS

2015/0124673 A1 * 5/2015 Ouchi .................. H04W 52/58
370/311
2017/0041882 A1 2/2017 Chae
(Continued)

FOREIGN PATENT DOCUMENTS

CN  102395184 A  3/2012
CN  103139889 A  6/2013
(Continued)

OTHER PUBLICATIONS

First Office Action received in application No. CN201811092849.0 dated Sep. 1, 2021.
(Continued)

*Primary Examiner* — Michael Thier
*Assistant Examiner* — Prince A Mensah
(74) *Attorney, Agent, or Firm* — Ascenda Law Group, PC

(57) ABSTRACT

The present disclosure discloses a method and device used in wireless communication node. A first node first receives K1 first-type radio signals, and then transmits a first signaling, receives a second signaling and transmits a first radio signal in sequence; the first signaling is used to indicate K2 first-type radio signal(s) of the K1 first-type radio signals, while the second signaling is used to indicate K3 first-type radio signal(s) of the K1 first-type radio signals; the K3 first-type radio signal(s) is(are) respectively used to determine K3 pathloss(es). By designing a mechanism of interaction between a terminal and a base station, and the channel quality of sidelink detected by the terminal to determine a transmitting power of sidelink, the present disclosure manages to reduce interference to a cellular network while ensuring sidelink performance, thus improving the system's overall performance.

20 Claims, 13 Drawing Sheets

(51) Int. Cl.
*H04B 17/309* (2015.01)
*H04L 5/00* (2006.01)
*H04W 72/542* (2023.01)

(58) Field of Classification Search
CPC ... H04B 17/309; H04B 17/336; H04B 17/345
See application file for complete search history.

(56) References Cited

U.S. PATENT DOCUMENTS

| | | | |
|---|---|---|---|
| 2018/0035389 A1 | 2/2018 | Hessler | |
| 2018/0219664 A1* | 8/2018 | Guo | H04W 24/10 |
| 2018/0332541 A1* | 11/2018 | Liu | H04W 52/10 |
| 2019/0058561 A1* | 2/2019 | Ho | H04B 7/088 |
| 2019/0199487 A1* | 6/2019 | Ko | H04L 27/2634 |
| 2019/0356438 A1* | 11/2019 | Lee | H04B 7/0408 |
| 2020/0015229 A1* | 1/2020 | Yang | H04W 76/15 |
| 2020/0068500 A1* | 2/2020 | Liu | H04W 52/36 |
| 2020/0280409 A1* | 9/2020 | Grant | H04L 5/0044 |
| 2021/0007060 A1* | 1/2021 | Chen | H04W 52/242 |
| 2021/0144651 A1* | 5/2021 | Sun | H04W 74/0833 |

FOREIGN PATENT DOCUMENTS

| | | |
|---|---|---|
| CN | 104105185 A | 10/2014 |
| CN | 104956740 A | 9/2015 |
| CN | 107734557 A | 2/2018 |
| CN | 107735973 A | 2/2018 |
| CN | 2018062969 A1 | 4/2018 |
| CN | 108023699 A | 5/2018 |

OTHER PUBLICATIONS

First Search Report received in application No. CN201811092849.0 dated Aug. 18, 2021.
ISR in application PCT/CN2019/104047 dated Oct. 31, 2019.
Samsung. "Discussion on Physical Layer Structures and Procedures for NR V2X"3GPP TSG RAN WGI4, R1-1808776,Aug. 24, 2018(Aug. 24, 2018).
CN201811092849.0 Notification to Grant Patent Right for Invention dated Dec. 31, 2021.
CN201811092849.0 Second Office Action dated Feb. 23, 2022.

* cited by examiner

METHOD AND DEVICE USED IN WIRELESS COMMUNICATION NODE

CROSS REFERENCE TO RELATED APPLICATIONS

This application is a continuation of International Application No. PCT/CN2019/104047, filed Sep. 2, 2019, claims the priority benefit of Chinese Patent Application No. 201811092849.0, filed on Sep. 18, 2018, the full disclosure of which is incorporated herein by reference.

BACKGROUND

Technical Field

The present disclosure relates to transmission methods and devices in wireless communication systems, and in particular to a communication method and device for sidelink in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary, the technical Study Item (SI) of NR V2X was initiated.

SUMMARY

In order to satisfy emerging traffic requirements, the NR V2X system, upgraded based on LTE V2X system, is featured with higher throughput and reliability, lower delay, a further transmission distance, much more precise positioning, and more changeable packet size and period of transmission. It also has key technical features that can work more effectively with existing 3GPP and non-3GPP technologies. At present, the working mode of LTE V2X system is limited to broadcast transmission. However, as a consensus drawn at the 3GPP RAN #80 Plenary, the study of NR V2X will be focused on a technical scheme supporting varied working modes, such as unicast, groupcast and broadcast.

Under the current LTE Device to Device (D2D)/V2X working mode, a UE transmits a broadcast radio signal through sidelink rather than transmitting a radio signal targeting a specific UE. To make sure that no interference will be caused to uplink transmission of a cellular network on a Uu interface, transmitting power on sidelink is determined based on a pathloss between Uu interfaces at a transmitting terminal and a base station. However, when two terminals in D2D or V2X communications are not far from each other, the above-mentioned transmitting power determined based on the pathloss between Uu interfaces will result in power wastes of the terminals. Besides, when there are multiple beams between a base station and a terminal, the present method of transmitting power determination needs to be redesigned.

In view of the above problem, the present disclosure provides a solution to support unicast transmission. It should be noted that if no conflict is incurred, the embodiments of the UE in the present disclosure and the characteristics of the embodiments can be applied to a base station, and vice versa. And the embodiments in the present disclosure and the characteristics of the embodiments can be arbitrarily combined if there is no conflict. Further, though originally targeted at a unicast-based transmission mechanism, the present disclosure is also applicable to broadcast transmission and groupcast transmissions; what's more, though originally targeting single-carrier communications, the present disclosure is also applicable to multicarrier communications.

The present disclosure provides a method in a first node for wireless communications, comprising:

receiving K1 first-type radio signals, K1 being a positive integer greater than 1;

transmitting a first signaling;

receiving a second signaling; and transmitting a first radio signal;

herein, the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a receiver of the first radio signal includes a second node, and a transmitter of the K1 first-type radio signals is a third node, the second node being non-co-located with the third node.

In one embodiment, the above method is advantageous in that the K1 first-type radio signals respectively correspond to K1 beams, the first node determines K2 beam(s) out of the K1 beams according to channel quality on sidelink and then reports to a base station that a terminal's transmitting power for a sidelink radio signal in the direction of the K2 beam(s) will not interfere with the base station.

In one embodiment, the above method is also advantageous in that a base station indicates K3 beam(s) of the K1 beams to a first node via a second signaling so as to restrict a terminal's transmitting power for a radio signal on sidelink, thereby ensuring that the base station is not interfered by the sidelink signal on the K3 beam(s).

According to one aspect of the present disclosure, the above method is characterized in that the K3 is greater than 1, the K3 first-type radio signals respectively correspond to K3 first-type factors, and K3 first-type parameters are obtained by respectively multiplying the K3 pathlosses by the K3 first-type factors; a target parameter is a smallest first-type parameter of the K3 first-type parameters, and the target parameter is linear with a first reference power value, the first reference power value being used to determine the first power value.

In one embodiment, the above method is advantageous in ensuring that transmitting power of the first radio signal is a smallest one of the K3 power values calculated based on K3 pathlosses, which helps reduce the power consumption of a first node.

According to one aspect of the present disclosure, the above method is characterized in comprising:

calculating K1 pathlosses respectively according to the K1 first-type radio signals; and selecting the K2 first-type radio signal(s) from the K1 first-type radio signals according to the K1 pathlosses.

According to one aspect of the present disclosure, the above method is characterized in comprising:

receiving a third signaling;

herein, the third signaling is used to determine a transmitting power value of each first-type radio signal of the K1 first-type radio signals.

According to one aspect of the present disclosure, the above method is characterized in comprising:

receiving M1 second-type radio signal(s), M1 being a positive integer;

herein, the M1 second-type radio signal(s) is(are) respectively used to determine M1 pathloss(es), and the M1 pathloss(es) is(are) used to determine the K2 first-type radio signal(s) out of the K1 first-type radio signals.

In one embodiment, the above method is advantageous in that each of the M1 pathloss(es) is a pathloss on sidelink, and selecting of the K2 first-type radio signal(s) is determined based on the sidelink pathloss(es), which not only ensures that a transmitting power on sidelink meets sidelink transmission requirements but also avoids a larger sidelink transmitting power that will influence quality of a Uu link.

According to one aspect of the present disclosure, the above method is characterized in comprising:

receives first information;

herein, the first information is used to indicate K1 first-type factors, the K1 first-type radio signals are respectively used to determine K1 pathlosses, and K1 first-type parameters are obtained by respectively multiplying the K1 pathlosses by the K1 first-type factors; the K1 first-type parameters are used to determine the K2 first-type radio signal(s); the first information is transmitted via an air interface.

According to one aspect of the present disclosure, the above method is characterized in comprising:

receiving second information;

herein, the second information is used to indicate M1 second-type factor(s), the M1 second-type radio signal(s) is(are) respectively used to determine the M1 pathloss(es), and M1 second-type parameter(s) is(are) obtained by respectively multiplying the M1 pathloss(es) by the M1 second-type factor(s); the M1 second-type parameter(s) is(are) used to determine the K2 first-type radio signal(s); the second information is transmitted via an air interface.

According to one aspect of the present disclosure, the above method is characterized in comprising:

receiving third information;

herein, the third information is used to determine M1 second-type power value(s), and the M1 second-type radio signal(s) is(are) transmitted respectively employing the M1 second-type power value(s); the third information is transmitted via an air interface.

According to one aspect of the present disclosure, the above method is characterized in that there is at least one first-type radio signal of the K1 first-type radio signals being quasi-co-located with the first radio signal.

In one embodiment, the above method is advantageous in that only when one of the K1 first-type radio signals is quasi-co-located with the first radio signal will the method of power control in the present disclosure be used, namely, only when a beam employed on sidelink is correlated to a beam on a Uu link can the method of power control in the present disclosure be utilized, thus streamlining the implementation of the proposed method.

The present disclosure provides a method in a third node for wireless communications, comprising:

transmitting K1 first-type radio signals, K1 being a positive integer greater than 1;

receiving a first signaling; and transmitting a second signaling;

herein, the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by the third node for determining the K3 first-type radio signal(s); the K3 first-type radio signal(s) is(are) respectively used to determine K3 pathloss(es), and the K3 pathloss(es) is(are) used to determine a first power value, a transmitting power value of a first radio signal being the first power value; a receiver of the first radio signal includes a second node, and a transmitter of the first signaling transmits the first radio signal, the second node being non-co-located with the third node.

According to one aspect of the present disclosure, the above method is characterized in that the K3 is greater than 1, the K3 first-type radio signals respectively correspond to K3 first-type factors, and K3 first-type parameters are obtained by respectively multiplying the K3 pathlosses by the K3 first-type factors; a target parameter is a smallest first-type parameter of the K3 first-type parameters, and the target parameter is linear with a first reference power value, the first reference power value being used by a transmitter of the first signaling for determining the first power value.

According to one aspect of the present disclosure, the above method is characterized in comprising:

transmitting a third signaling;

herein, the third signaling is used to determine a transmitting power value of each first-type radio signal of the K1 first-type radio signals.

According to one aspect of the present disclosure, the above method is characterized in comprising:

transmitting first information;

herein, the first information is used to indicate K1 first-type factors, the K1 first-type radio signals are respectively used to determine K1 pathlosses, and K1 first-type parameters are obtained by respectively multiplying the K1 pathlosses by the K1 first-type factors; the K1 first-type parameters are used by the transmitter of the first signaling for determining the K2 first-type radio signal(s); the first information is transmitted via an air interface.

According to one aspect of the present disclosure, the above method is characterized in comprising:

transmitting second information;

herein, the second information is used to indicate M1 second-type factor(s), the M1 second-type factor(s) is(are) respectively associated with M1 second-type radio signal(s), and the M1 second-type radio signal(s) is(are) respectively used to determine M1 pathloss(es), and M1 second-type parameter(s) is(are) obtained by respectively multiplying the M1 pathloss(es) by the M1 second-type factor(s); the M1 second-type parameter(s) is(are) used by the transmitter of the first signaling for determining the K2 first-type radio signal(s); a transmitter of the M1 second-type radio signal(s) is communications equipment other than the third node; the second information is transmitted via an air interface.

According to one aspect of the present disclosure, the above method is characterized in that there is at least one first-type radio signal of the K1 first-type radio signals being quasi-co-located with the first radio signal.

The present disclosure provides a method in a second node for wireless communications, comprising:
receiving a first radio signal;
herein, a first signaling is used to indicate K2 first-type radio signal(s) out of the K1 first-type radio signals, K2 being a positive integer no greater than the K1; a second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a transmitter of the K1 first-type radio signals is a third node, the second node being non-co-located with the third node.

According to one aspect of the present disclosure, the above method is characterized in that the K3 is greater than 1, the K3 first-type radio signals respectively correspond to K3 first-type factors, and K3 first-type parameters are obtained by respectively multiplying the K3 pathlosses by the K3 first-type factors; a target parameter is a smallest first-type parameter of the K3 first-type parameters, and the target parameter is linear with a first reference power value, the first reference power value being used by a transmitter of the first radio signal for determining the first power value.

According to one aspect of the present disclosure, the above method is characterized in comprising:
transmitting M1 second-type radio signal(s), M1 being a positive integer;
herein, the M1 second-type radio signal(s) is(are) respectively used to determine M1 pathloss(es), and the M1 pathloss(es) is(are) used by a transmitter of the first radio signal for determining the K2 first-type radio signal(s) out of the K1 first-type radio signals.

According to one aspect of the present disclosure, the above method is characterized in comprising:
transmitting second information;
herein, the second information is used to indicate M1 second-type factor(s), the M1 second-type radio signal(s) is(are) respectively used to determine the M1 pathloss(es), and M1 second-type parameter(s) is(are) obtained by respectively multiplying the M1 pathloss(es) by the M1 second-type factor(s); the M1 second-type parameter(s) is(are) used by a transmitter of the first radio signal for determining the K2 first-type radio signal(s); the second information is transmitted via an air interface.

According to one aspect of the present disclosure, the above method is characterized in comprising:
transmitting third information;
herein, the third information is used to determine M1 second-type power value(s), and the M1 second-type radio signal(s) is(are) transmitted respectively employing the M1 second-type power value(s); the third information is transmitted via an air interface.

According to one aspect of the present disclosure, the above method is characterized in that there is at least one first-type radio signal of the K1 first-type radio signals being quasi-co-located with the first radio signal.

The present disclosure provides a first node for wireless communications, comprising:
a first receiver, which receives K1 first-type radio signals, K1 being a positive integer greater than 1;
a first transmitter, which transmits a first signaling;
a second receiver, which receives a second signaling; and
a second transmitter, which transmits a first radio signal;
herein, the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a receiver of the first radio signal includes a second node, and a transmitter of the K1 first-type radio signals is a third node, the second node being non-co-located with the third node.

The present disclosure provides a third node for wireless communications, comprising:
a third transmitter, which transmits K1 first-type radio signals, K1 being a positive integer greater than 1;
a third receiver, which receives a first signaling; and
a fourth transmitter, which transmits a second signaling;
herein, the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by the third node for determining the K3 first-type radio signal(s); the K3 first-type radio signal(s) is(are) respectively used to determine K3 pathloss(es), and the K3 pathloss(es) is(are) used to determine a first power value, a transmitting power value of a first radio signal being the first power value; a receiver of the first radio signal includes a second node, and a transmitter of the first signaling transmits the first radio signal, the second node being non-co-located with the third node.

The present disclosure provides a second node for wireless communications, comprising:
a fourth receiver, which receives a first radio signal;
herein, a first signaling is used to indicate K2 first-type radio signal(s) out of the K1 first-type radio signals, K2 being a positive integer no greater than the K1;
a second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a transmitter of the K1 first-type radio signals is a third node, the second node being non-co-located with the third node.

In one embodiment, the present disclosure is advantageous over the prior art in the following aspects:

The K1 first-type radio signals respectively correspond to K1 beams, and the first node determines K2 beam(s) out of the K1 beams according to channel quality on sidelink and reports to a base station that in the direction of the K2 beam(s) a terminal's transmitting power for a sidelink radio signal won't interfere with the base station; additionally, the base station indicates K3 beam(s) of the K1 beams to the first node via a second signaling, so that the terminal's transmitting power for a sidelink radio signal is limited, which further prevents interference of sidelink signal to the base station on the K3 beam(s).

The disclosure ensures that transmitting power of the first radio signal is a minimum value of K3 power values respectively calculated according to K3 pathlosses, thereby reducing power consumption of a first node.

The M1 pathloss(es) is(are) sidelink pathloss(es), based on which the K2 first-type radio signal(s) is(are) determined so as to ensure that transmitting power on sidelink can meet requirements of sidelink transmissions while avoiding a larger sidelink transmitting that will impact quality of Uu link.

Only when there is correlation between a beam employed on sidelink and that on a Uu link can the method of power control provided in the present disclosure be used, thus simplifying the implementation of the method proposed above while taking full account of the gains brought about by beamforming.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
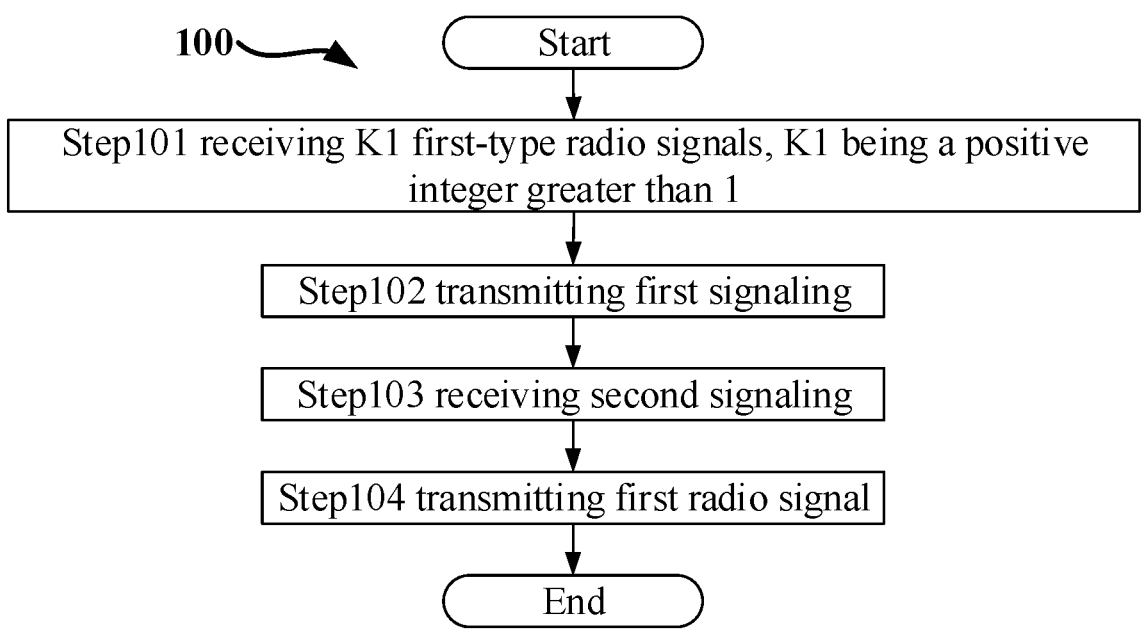
FIG. 1 illustrates a flowchart of a first signaling according to one embodiment of the present disclosure.

Embodiment 1 illustrates a flowchart of a first signaling, as shown in FIG. 1. In step 100 illustrated by FIG. 1, each box represents a step.

In Embodiment 1, the first node in the present disclosure receives K1 first-type radio signals in step 101, K1 being a positive integer greater than 1; transmits a first signaling in step 102; receives a second signaling in step 103; and transmits a first radio signal in step 104; the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a receiver of the first radio signal includes a second node, and a transmitter of the K1 first-type radio signals is a third node, the second node being non-co-located with the third node.

In one embodiment, the first node is a terminal.

In one embodiment, the first node is a UE.

In one embodiment, the first node is a vehicle.

In one embodiment, the first node is a Road Side Unit (RSU).

In one embodiment, the second node is a terminal.

In one embodiment, the second node is a UE.

In one embodiment, the second node is a vehicle.

In one embodiment, the second node is a Road Side Unit (RSU).

In one embodiment, the third node transmits the second signaling.

In one embodiment, the third node is a base station.

In one embodiment, the third node provides the first node with cellular network traffic service.

In one embodiment, the third node is a base station corresponding to a cell that serves the first node.

In one embodiment, the first radio signal is an interfering signal to the third node.

In one embodiment, the third node is not aware of time-domain resources occupied by the first radio signal.

In one embodiment, the third node is not aware of frequency-domain resources occupied by the first radio signal.

In one embodiment, any first-type radio signal of the K2 first-type radio signal(s) is one of the K1 first-type radio signals.

In one embodiment, at least one of the K1 first-type radio signals is not any first-type radio signal of the K2 first-type radio signal(s).

In one embodiment, any first-type radio signal of the K3 first-type radio signal(s) is one of the K1 first-type radio signals.

In one embodiment, at least one of the K1 first-type radio signals is not any first-type radio signal of the K3 first-type radio signal(s).

In one embodiment, any first-type radio signal of the K3 first-type radio signal(s) is one of the K2 first-type radio signal(s).

In one embodiment, at least one of the K2 first-type radio signals is not any first-type radio signal of the K3 first-type radio signal(s).

In one embodiment, the K1 first-type radio signals are respectively transmitted in K1 first-type reference signal resources; the first signaling is used to indicate K2 first-type reference signal resource(s) out of the K1 first-type reference signal resources, while the second signaling is used to indicate K3 first-type reference signal resource(s) out of the K1 first-type reference signal resources.

In one subembodiment, any of the K1 first-type reference signal resources comprises a Channel State Information Reference Signal (CSI-RS) resource.

In one subembodiment, any of the K1 first-type reference signal resources comprises a CSI-RS Resource Set.

In one subembodiment, the K1 first-type reference signal resources respectively correspond to K1 CSI-RS Resource Indexes (CRIs).

In one subembodiment, the first signaling comprises K2 CRI(s), the K2 CRI(s) being respectively associated with the K2 first-type reference signal resource(s).

In one subembodiment, the second signaling comprises K3 CRI(s), the K3 CRI(s) being respectively associated with the K3 first-type reference signal resource(s).

In one subembodiment, the K1 first-type radio signals respectively correspond to K1 first-type indexes, the above phrase that the first signaling is used to indicate the K2 first-type reference signal resource(s) out of the K1 first-type reference signal resources includes: the first signaling is used to indicate K2 first-type index(es) respectively corresponding to the K2 first-type reference signal resource(s) out of the K1 first-type indexes.

In one embodiment, the K3 first-type radio signal(s) respectively corresponds (correspond) to K3 Transmission Configuration Indication(s) (TCI).

In one embodiment, the above phrase that the first signaling is used by a transmitter of the second signaling for determining the K3 first-type radio signal(s) includes: the transmitter of the second signaling selects the K3 first-type radio signal(s) from the K2 first-type radio signal(s), the K3 being a positive integer no greater than the K2.

In one embodiment, the above phrase that the first signaling is used by a transmitter of the second signaling for determining the K3 first-type radio signal(s) includes: the transmitter of the second signaling selects Q1 first-type radio signal(s) from the K2 first-type radio signals, and selects Q2 first-type radio signal(s) from first-type radio signal(s) of the K1 first-type radio signals other than the K2 first-type radio signals, the Q1 first-type radio signal(s) and the Q2 first-type radio signal(s) composing the K3 first-type radio signals, Q1 being a positive integer less than the K2, Q2 being a positive integer less than (K1-K2), and the Q1 plus Q2 makes the K3.

In one embodiment, the above phrase that the first signaling is used by a transmitter of the second signaling for determining the K3 first-type radio signal(s) includes: the transmitter of the second signaling receives multiple signalings, and the first signaling is one of the multiple signalings; each of the signalings is used to indicate a positive integer number of first-type radio signal(s), and each of the K2 first-type radio signal(s) is indicated by at least one signaling of the multiple signalings.

In one subembodiment, the multiple signalings are repeatedly transmitted.

In one subembodiment, the multiple signalings are transmitted by the first node.

In one subembodiment, a transmitter of at least one of the multiple signalings is non-co-located with the first node.

In one embodiment, any of the K1 first-type radio signals is a CSI-RS.

In one embodiment, the K1 first-type radio signals are respectively transmitted by K1 first-type antenna port groups.

In one embodiment, the first signaling is a physical-layer signaling.

In one embodiment, the first signaling is Uplink Control Information (UCI).

In one embodiment, the first signaling is transmitted on a Physical Uplink Shared Channel (PUSCH).

In one embodiment, the first signaling is transmitted on a Physical Uplink Control Channel (PUCCH).

In one embodiment, the first signaling comprises Channel State Information (CSI).

In one embodiment, the first signaling is a higher-layer signaling.

In one embodiment, the second signaling is a physical-layer signaling.

In one embodiment, the second signaling is a higher-layer signaling.

In one embodiment, the second signaling is Downlink Control Information (DCI).

In one embodiment, the second signaling is transmitted on a Physical Downlink Shared Channel (PDSCH).

In one embodiment, the second signaling is transmitted on a Physical Downlink Control Channel (PDCCH).

In one embodiment, the above phrase of the second node being non-co-located with the third node includes: the second node and the third node are different pieces of communication equipment.

In one embodiment, the above phrase of the second node being non-co-located with the third node includes: there is no wireless connection between the second node and the third node.

In one embodiment, the above phrase of the second node being non-co-located with the third node includes: the second node and the third node are located at different places.

In one embodiment, the above phrase of the second node being non-co-located with the third node includes: the third node is a base station, and the second node is communications equipment other than the base station.

In one embodiment, the above phrase of the second node being non-co-located with the third node includes: the third node and the second node respectively correspond to different identifiers.

In one embodiment, the above method that the K3 first-type radio signal(s) is(are) respectively used to determine K3 pathloss(es) includes: transmitting power value(s) of the K3 first-type radio signal(s) is(are) K3 first-type power value(s) respectively; the K3 first-type power value(s)

is(are) configured to the first node via a higher-layer signaling, or any of the K3 first-type power value(s) is fixed.

In one subembodiment, any of the K3 first-type power value(s) is measured by dBm, or any of the K3 first-type power value(s) is measured by Watt (W), or any of the K3 first-type power value(s) is measured by milliWatt (mW).

In one embodiment, the above method that the K3 first-type radio signal(s) is(are) respectively used to determine K3 pathloss(es) includes: transmitting power value(s) of the K3 first-type radio signal(s) is(are) K3 first-type power value(s) respectively; receiving power value(s) of the K3 first-type radio signal(s) at the first node is(are) respectively K3 first-type receiving power value(s), and the K3 pathloss(es) is(are) obtained by respectively subtracting the K3 first-type receiving power value(s) from the K3 first-type power value(s).

In one subembodiment, any of the K3 first-type power value(s) is measured by dBm, or any of the K3 first-type power value(s) is measured by Watt (W), or any of the K3 first-type power value(s) is measured by milliWatt (mW).

In one subembodiment, any first-type receiving power value of the K3 first-type receiving power value(s) is filtered through a higher-layer filter.

In one subembodiment, any of the K3 first-type receiving power value(s) is measured by dBm, or any of the K3 first-type receiving power value(s) is measured by Watt (W), or any of the K3 first-type receiving power value(s) is measured by milliWatt (mW).

In one embodiment, any of the K3 pathloss(es) is measured by dB.

In one embodiment, K3 is equal to K2; the K2 first-type radio signal(s) is(are) respectively transmitted in K2 first-type reference signal resource(s), while the K3 first-type radio signal(s) is(are) respectively transmitted in K3 first-type reference signal resource(s); the K2 first-type reference signal resource(s) is(are) the same as the K3 first-type reference signal resource(s) respectively; the second signaling comprises a target bit, the target bit being used by the first node for determining whether the K3 pathloss(es) can be used to determine the first power value.

In one subembodiment, the target bit is equal to 1, and the first node determines that the K3 pathloss(es) can be used to determine the first power value.

In one subembodiment, the target bit is equal to 0, and the first node determines that the K3 pathloss(es) cannot be used to determine the first power value.

In one embodiment, K3 is less than K2; the K2 first-type radio signals are respectively transmitted in K2 first-type reference signal resources, while the K3 first-type radio signal(s) is(are) respectively transmitted in K3 first-type reference signal resource(s); the K3 first-type reference signal resource(s) is(are) a subset of the K2 first-type reference signal resources, and the second signaling is used to indicate the K3 first-type reference signal resource(s) out of the K2 first-type reference signal resource.

In one embodiment, at least one first-type radio signal of the K3 first-type radio signal(s) is one of the K2 first-type radio signal(s).

In one embodiment, the above phrase that the K3 pathloss(es) is(are) used to determine a first power value includes: the K3 first-type radio signals respectively correspond to K3 first-type factors, and K3 first-type parameters are obtained by respectively multiplying the K3 pathlosses by K3 first-type factors; a candidate parameter is a greatest first-type parameter of the K3 first-type parameters, and the candidate parameter is linear with a first reference power value, the first reference power value being used to determine the first power value.

In one subembodiment, the first power value is obtained according to the following formula:

$$P = \min\{P_C, 10 \log M + P_1 + \max\{\alpha_1 PL_1, \alpha_2 PL_2, \ldots, \alpha_{K3} PL_{K3}\}\}$$

Herein, the $P_C$ refers to $P_{CMAX,PSSCH}$ in TS36.213; the first reference power value is a polynomial $10 \log M + P_1 + \max\{\alpha_1 PL_1, \alpha PL_2, \ldots, \alpha_{K3} PL_{K3}\}$; the candidate parameter is $\max\{\alpha_1 PL_1, \alpha_2 PL_2, \ldots, \alpha_{K3} PL_{K3}\}$; the M is related to a bandwidth occupied by the first radio signal represented by a number of Resource Elements (REs); the $P_1$ is configured by a higher-layer signaling, the symbols from $\alpha_1$ to $\alpha_{K3}$ are respectively the K3 first-type factors, and the symbols from $PL_1$ to $PL_{K3}$ are respectively the K3 pathlosses.

In one subembodiment, the first power value is obtained according to the following formula:

$$P = 10\log_{10}\left(\frac{M}{M + 10^{\frac{3}{10}} \times M}\right) + \{P_{CMAX},$$

$$10\log_{10}\left(M + 10^{\frac{3}{10}} \times M\right) + P_1 + \max\{\alpha_1 PL_1, \alpha_2 PL_2, \ldots, \alpha_{K3} PL_{K3}\}\}$$

Herein, the $P_C$ refers to $P_{CMAX}$ in TS36.213; the first reference power value is a polynomial $$10\log_{10}\left(M + 10^{\frac{3}{10}} \times M\right) + P_1 + \max\{\alpha_1 PL_1, \alpha_2 PL_2, \ldots, \alpha_{K3} PL_{K3}\};$$

the candidate parameter is $\max\{\alpha_1 PL_1, \alpha_2 PL_2, \ldots, \alpha_{K3} PL_{K3}\}$; the M is related to a bandwidth occupied by the first radio signal represented by a number of Resource Elements (REs); the $P_1$ is configured by a higher-layer signaling, the symbols from $\alpha_1$ to $\alpha_{K3}$ are respectively the K3 first-type factors, and the symbols from $PL_1$ to $PL_{K3}$ are respectively the K3 pathlosses.

In one subembodiment, the first power value is obtained according to the following formula:

$$P = 10\log_{10}\left(\frac{M}{M + 10^{\frac{3}{10}} \times M_1}\right) + A$$

Herein, the M is related to a bandwidth occupied by the first radio signal represented by a number of REs; the $M_1$ is equal to 2, or the $M_1$ is related to a bandwidth occupied by a PSCCH scheduling the first radio signal; and the first reference power value is a term of polynomial A.

In one subsidiary embodiment of the above subembodiment, an RRC signaling maxTxpower is configured, the polynomial A is equivalent to the following formula:

$$A = \min\{P_C, P_{MAX\_CBR},$$

$$10\log_{10}\left(M + 10^{\frac{3}{10}} \times M_1\right) + P_3 + \max\{\alpha_1 PL_1, \alpha_2 PL_2, \ldots, \alpha_{K3} PL_{K3}\}\}$$

Herein, the $P_C$ refers to $P_{CMAX}$ in TS36.213; the $P_{MAX\_CBR}$ is configured through the RRC signaling maxTxpower; the first reference power value is a polynomial $$10log_{10}\left(M + 10^{\frac{3}{10}} \times M_1\right) + P_3 + \max\{\alpha_1 PL_1, \alpha_2 PL_2, \ldots, \alpha_{K3} PL_{K3}\};$$

the candidate parameter is $\max\{\alpha_1 PL_1, \alpha_2 PL_2, \ldots, \alpha_{K3} PL_{K3}\}$; the $P_3$ is configured by a higher-layer signaling; the symbols from $\alpha_1$ to $\alpha_{K3}$ are respectively the K3 first-type factors, and the symbols from $PL_1$ to $PL_{K3}$ are respectively the K3 pathlosses.

In one subsidiary embodiment of the above subembodiment, an RRC signaling maxTxpower is not configured, the polynomial A is equivalent to the following formula:

$$A = \min\{P_C,$$
$$10log_{10}\left(M + 10^{\frac{3}{10}} \times M_1\right) + P_3 + \max\{\alpha_1 P:_1, \alpha_2 PL_2, \ldots, \alpha_{K3} PL_{K3}\}\}$$

The $P_C$ refers to $P_{CMAX}$ in TS36.213; the first reference power value is a polynomial $$10log_{10}\left(M + 10^{\frac{3}{10}} \times M_1\right) + P_3 + \max\{\alpha_1 PL_1, \alpha_2 PL_2, \ldots, \alpha_{K3} PL_{K3}\};$$

the candidate parameter is $\max\{\alpha_1 PL_1, \alpha_2 PL_2, \ldots, \alpha_{K3} PL_{K3}\}$; the $P_3$ is configured by a higher-layer signaling; the symbols from $\alpha_1$ to $\alpha_{K3}$ are respectively the K3 first-type factors, and the symbols from $PLL_1$ to $PL_{K3}$ are respectively the K3 pathlosses.

In one subembodiment, a linear correlation coefficient between the candidate parameter and the first reference power value is equal to 1.

In one embodiment, the above phrase that the K3 pathloss(es) is(are) used to determine a first power value includes: the K3 first-type radio signals respectively correspond to K3 first-type factors, and K3 first-type parameters are obtained by respectively multiplying the K3 pathlosses by K3 first-type factors; a candidate parameter is any first-type parameter of the K3 first-type parameters, and the candidate parameter is linear with a first reference power value, the first reference power value being used to determine the first power value.

In one subembodiment, the first power value is obtained according to the following formula:

$$P = \min\{P_C, 10 \log M + P_1 + \alpha_J PL_J\}$$

Herein, the $P_C$ refers to $P_{CMAX,PSSCH}$ in TS36.213; the first reference power value is a polynomial $10 \log M + P_1 + \alpha_J PL_J$; the M is related to a bandwidth occupied by the first radio signal represented by a number of REs; the $P_1$ is configured by a higher-layer signaling; the $\alpha_J$ is any one of the K3 first-type factor(s), the $PL_J$ is a pathloss for the $\alpha_J$, and the $\alpha_J PL_J$ is the candidate parameter.

In one subembodiment, the first power value is obtained according to the following formula:

$$P = 10log_{10}\left(\frac{M}{M + 10^{\frac{3}{10}} \times M}\right) +$$
$$\min\{P_{CMAX}, 10log_{10}\left(M + 10^{\frac{3}{10}} \times M\right) + P_1 + \alpha_J PL_J\}$$

Herein, the $P_C$ refers to $P_{CMAX}$ in TS36.213; the first reference power value is a polynomial $$10log_{10}\left(M + 10^{\frac{3}{10}} \times M\right) + P_1 + \alpha_J PL_J;$$

the M is related to a bandwidth occupied by the first radio signal represented by a number of REs; the $P_1$ is configured by a higher-layer signaling; the $\alpha_J$ is any one of the K3 first-type factor(s), the $PL_J$ is a pathloss for the $\alpha_J$, and the $\alpha_J PL_J$ is the candidate parameter.

In one subembodiment, the first power value is obtained according to the following formula:

$$P = 10log_{10}\left(\frac{M}{M + 10^{\frac{3}{10}} \times M_1}\right) + A$$

Herein, the M is related to a bandwidth occupied by the first radio signal represented by a number of REs; the $M_1$ is equal to 2, or the $M_1$ is related to a bandwidth occupied by a PSCCH scheduling the first radio signal; and the first reference power value is a term of polynomial A.

In one subsidiary embodiment of the above subembodiment, an RRC signaling maxTxpower is configured, the polynomial A is equivalent to the following formula:

$$A = \min\{P_C, P_{MAX\_CBR}, 10log_{10}\left(M + 10^{\frac{3}{10}} \times M_1\right) + P_3 + \alpha_J PL_J\}$$

the $P_C$ refers to $P_{CMAX}$ in TS36.213; the $P_{MAX\_CBR}$ is configured through the RRC signaling maxTxpower; the first reference power value is a polynomial $$10log_{10}\left(M + 10^{\frac{3}{10}} \times M_1\right) + P_3 + \alpha_J PL_J;$$

the M is related to a bandwidth occupied by the first radio signal represented by a number of REs; the $P_3$ is configured by a higher-layer signaling; the $\alpha_J$ is any one of the K3 first-type factor(s), the $PL_J$ is a pathloss for the $\alpha_J$, and the $\alpha_J PL_J$ is the candidate parameter.

In one subsidiary embodiment of the above subembodiment, an RRC signaling maxTxpower is not configured, the polynomial A is equivalent to the following formula:

$$A = \min\{P_C, 10log_{10}\left(M + 10^{\frac{3}{10}} \times M_1\right) + P_3 + \alpha_J PL_J\}$$

Herein, the $P_C$ refers to $P_{CMAX}$ in TS36.213; the first reference power value is a polynomia $$10log_{10}\left(M + 10^{\frac{3}{10}} \times M_1\right) + P_3 + \alpha_J PL_J;$$

the M is related to a bandwidth occupied by the first radio signal represented by a number of REs; the $P_3$ is configured by a higher-layer signaling; the $\alpha_J$ is any one of the K3 first-type factor(s), the $PL_j$ is a pathloss for the $\alpha_j$, and the $\alpha_j PL_j$ is the candidate parameter.

In one subembodiment, a linear correlation coefficient between the candidate parameter and the first reference power value is equal to 1.

In one embodiment, a physical-layer channel occupied by the first radio signal comprises a Physical Sidelink Shared Channel (PSSCH).

Embodiment 2

Figure 2:
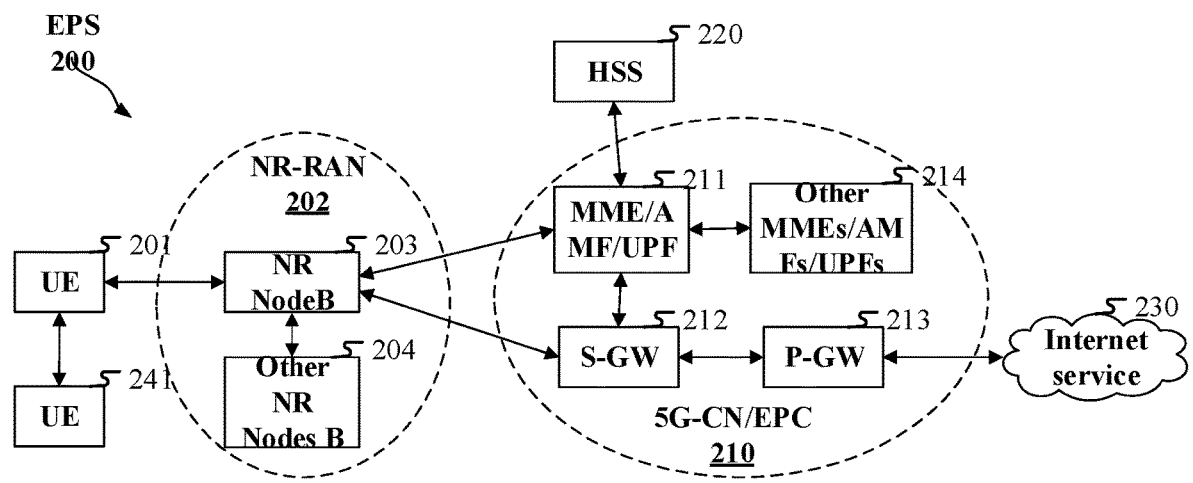
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200, which may comprise one or more UEs 201, a UE 241 in sidelink communication with the UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB203 corresponds to the third node in the present disclosure.

In one embodiment, an air interface between the UE201 and the gNB203 is a Uu interface.

In one embodiment, an air interface between the UE201 and the UE241 is a PC-5 interface.

In one embodiment, a wireless link between the UE201 and the gNB203 is a cellular-network link.

In one embodiment, a wireless link between the UE201 and the UE241 is a sidelink.

In one embodiment, the first node in the present disclosure is the UE201, and the second node in the present disclosure is a terminal within coverage of the gNB203.

In one embodiment, the first node in the present disclosure is the UE201, and the second node in the present disclosure is a terminal out of coverage of the gNB203.

In one embodiment, both the first node and the second node in the present disclosure are served by the gNB203.

In one embodiment, the UE201 supports beamforming-based communications.

In one embodiment, the UE241 supports beamforming-based communications.

In one embodiment, the gNB203 supports beamforming-based communications.

In one embodiment, unicast communication is supported between the UE201 and the UE241.

In one embodiment, non-broadcast communication is supported between the UE201 and the UE241.

In one embodiment, non-groupcast communication is supported between the UE201 and the UE241.

Embodiment 3

Figure 3:
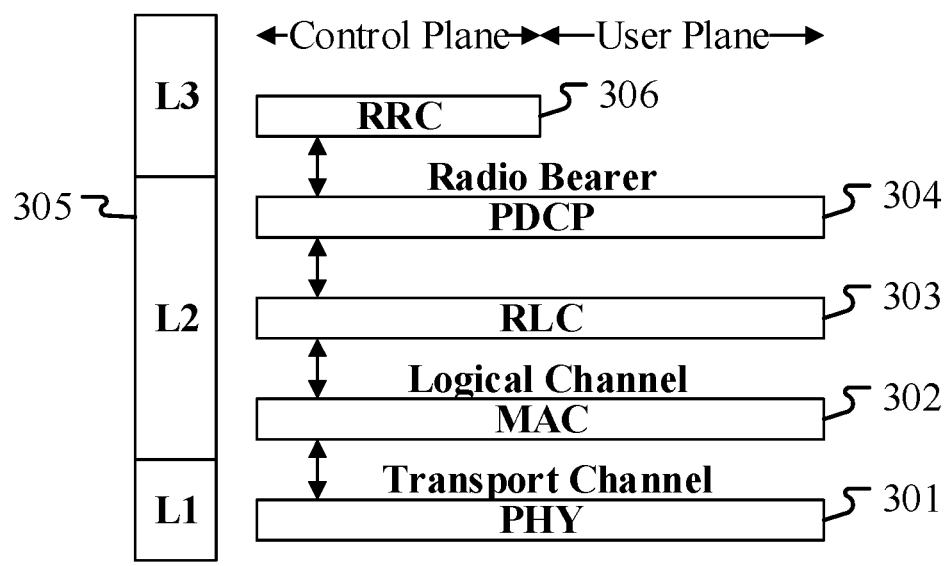
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher-layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, any of the K1 first-type radio signals in the present disclosure is generated by the PHY301.

In one embodiment, any of the K1 first-type radio signals in the present disclosure is generated by the MAC sublayer 302.

In one embodiment, the first signaling in the present disclosure is generated by the PHY301.

In one embodiment, the first signaling in the present disclosure is generated by the MAC sublayer 302.

In one embodiment, the first signaling in the present disclosure is generated by the RRC sublayer 306.

In one embodiment, the second signaling in the present disclosure is generated by the PHY301.

In one embodiment, the second signaling in the present disclosure is generated by the MAC sublayer 302.

In one embodiment, the second signaling in the present disclosure is generated by the RRC sublayer 306.

In one embodiment, the third signaling in the present disclosure is generated by the RRC sublayer 306.

In one embodiment, any of the M1 second-type radio signal(s) in the present disclosure is generated by the PHY301.

In one embodiment, the first information in the present disclosure is generated by the RRC sublayer 306.

In one embodiment, the second information in the present disclosure is generated by the RRC sublayer 306.

In one embodiment, the third information in the present disclosure is generated by the RRC sublayer 306.

In one embodiment, the third information in the present disclosure is generated by the PHY301.

In one embodiment, the third information in the present disclosure is generated by the MAC sublayer 302.

Embodiment 4

Figure 4:
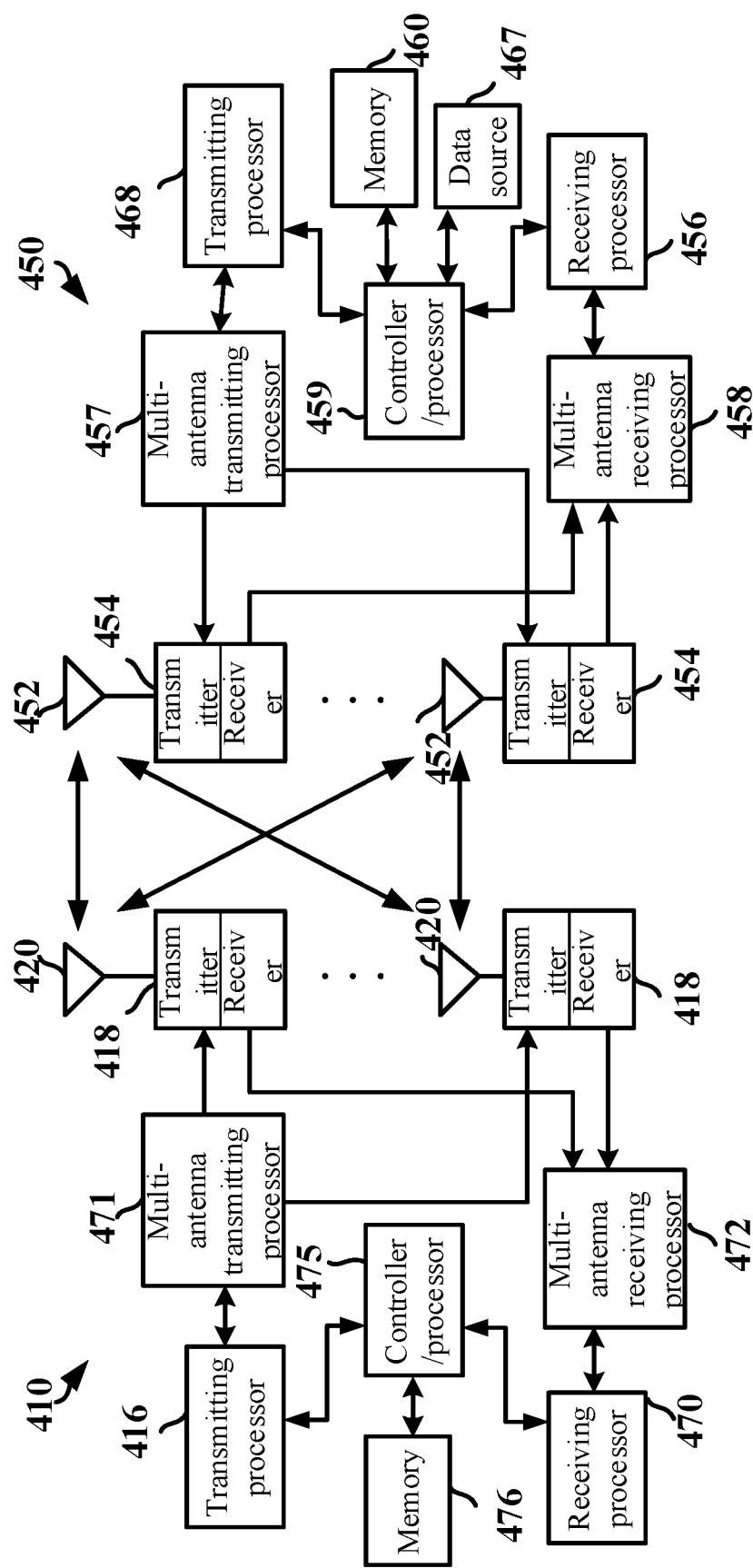
FIG. 4 illustrates a schematic diagram of a first communication node and a second communication node according to one embodiment of the present disclosure.

Embodiment 4 illustrates a schematic diagram of a first communication node and a second communication node, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

In a transmission from the second communication device 410 to the first communication device 450, at the second communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the first communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the second communication device 410 and the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the first communication device 450 and the second communication device 410, the controller/processor 475 provides de-multiplexing between a transport channel and a logical channel, packet reassembling, decrypting, header decompression, control signal processing so as to recover a higher-layer packet from the first communication device 450 (UE450). The higher-layer packet coming from the controller/processor 475 may be provided to the core network.

In one embodiment, the first communication device 450 comprises at least one processor and at least one memory. The at least one memory includes computer program codes. The at least one memory and the computer program codes are configured to be used in collaboration with the at least one processor. The first communication device 450 at least: receives K1 first-type radio signals in the first place, K1 being a positive integer greater than 1; and transmits a first signaling; and then receives a second signaling; and later transmits a first radio signal; the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a receiver of the first radio signal includes a second node, and a transmitter of the K1 first-type radio signals is a third node, the second node being non-co-located with the third node.

In one embodiment, the first communication device 450 comprises a memory that stores a computer readable instruction program. The computer readable instruction program generates actions when executed by at least one processor, which include: receiving K1 first-type radio signals in the first place, K1 being a positive integer greater than 1; and transmitting a first signaling; and then receiving a second signaling; and later transmitting a first radio signal; the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a receiver of the first radio signal includes a second node, and a transmitter of the K1 first-type radio signals is a third node, the second node being non-co-located with the third node.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits K1 first-type radio signals in the first place, K1 being a positive integer greater than 1; and receives a first signaling; and then transmits a second signaling; the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by the third node for determining the K3 first-type radio signal(s); the K3 first-type radio signal(s) is(are) respectively used to determine K3 pathloss(es), and the K3 pathloss(es) is(are) used to determine a first power value, a transmitting power value of a first radio signal being the first power value; a receiver of the first radio signal includes a second node, and a transmitter of the first signaling transmits the first radio signal, the second node being non-co-located with the third node.

In one embodiment, the second communication device 410 comprises a memory that stores a computer readable instruction program. The computer readable instruction program generates actions when executed by at least one processor, which include: transmitting K1 first-type radio signals in the first place, K1 being a positive integer greater than 1; and receiving a first signaling; and then transmitting a second signaling; the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by the third node for determining the K3 first-type radio signal(s); the K3 first-type radio signal(s) is(are) respectively used to determine K3 pathloss(es), and the K3 pathloss(es) is(are) used to determine a first power value, a transmitting power value of a first radio signal being the first power value; a receiver of the first radio signal includes a second node, and a transmitter of the first signaling transmits the first radio signal, the second node being non-co-located with the third node.

In one embodiment, the second communication device 410 comprises at least one processor and at least one memory. The at least one memory includes computer program codes. The at least one memory and the computer program codes are configured to be used in collaboration with the at least one processor. The second communication device 410 at least receives a first radio signal; a first signaling is used to indicate K2 first-type radio signal(s) out of K1 first-type radio signals, K2 being a positive integer no greater than the K1; a second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a transmitter of the K1 first-type radio signals is a third node, the second node being non-co-located with the third node.

In one embodiment, the second communication device 410 comprises a memory that stores a computer readable instruction program. The computer readable instruction program generates an action when executed by at least one processor, which includes: receiving a first radio signal; a first signaling is used to indicate K2 first-type radio signal(s) out of K1 first-type radio signals, K2 being a positive integer no greater than the K1; a second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a transmitter of the K1 first-type radio signals is a third node, the second node being non-co-located with the third node.

In one embodiment, the first communication device 450 corresponds to a first node in the present disclosure.

In one embodiment, the second communication device 410 corresponds to a second node in the present disclosure.

In one embodiment, the second communication device 410 corresponds to a third node in the present disclosure.

In one embodiment, at least one of the antenna 452, the receiver 454, the multi-antenna receiving processor 458 or the receiving processor 456 is used to receive the K1 first-type radio signals in the present disclosure; at least one of the antenna 420, the transmitter 418, the multi-antenna transmitting processor 471 or the transmitting processor 416 is used to transmit the K1 first-type radio signals in the present disclosure; the K1 is a positive integer greater than 1.

In one embodiment, at least one of the antenna 452, the transmitter 454, the multi-antenna transmitting processor 457 or the transmitting processor 468 is used to transmit the first signaling in the present disclosure; at least one of the antenna 420, the receiver 418, the multi-antenna receiving processor 472 or the receiving processor 470 is used to receive the first signaling in the present disclosure.

In one embodiment, at least one of the antenna 452, the receiver 454, the multi-antenna receiving processor 458 or the receiving processor 456 is used to receive the second signaling in the present disclosure; at least one of the antenna 420, the transmitter 418, the multi-antenna transmitting processor 471 or the transmitting processor 416 is used to transmit the second signaling in the present disclosure.

In one embodiment, at least one of the antenna 452, the transmitter 454, the multi-antenna transmitting processor 457 or the transmitting processor 468 is used to transmit the first radio signal in the present disclosure; at least one of the antenna 420, the receiver 418, the multi-antenna receiving processor 472 or the receiving processor 470 is used to receive the first radio signal in the present disclosure.

In one embodiment, at least one of the antenna 452, the receiver 454, the multi-antenna receiving processor 458, the receiving processor 456 or the controller/processor 459 is used to calculate K1 pathlosses respectively according to the K1 first-type radio signals.

In one embodiment, at least one of the antenna 452, the transmitter 454, the multi-antenna transmitting processor 457, the transmitting processor 468 or the controller/processor 459 is used to select the K2 first-type radio signal(s) from the K1 first-type radio signals according to the K1 pathlosses.

In one embodiment, at least one of the antenna 452, the receiver 454, the multi-antenna receiving processor 458 or the receiving processor 456 is used to receive the third signaling in the present disclosure; at least one of the antenna 420, the transmitter 418, the multi-antenna transmitting processor 471 or the transmitting processor 416 is used to transmit the third signaling in the present disclosure.

In one embodiment, at least one of the antenna 452, the receiver 454, the multi-antenna receiving processor 458 or the receiving processor 456 is used to receive the M1 second-type radio signal(s) in the present disclosure; at least one of the antenna 420, the transmitter 418, the multi-antenna transmitting processor 471 or the transmitting processor 416 is used to transmit the M1 second-type radio signal(s) in the present disclosure; the M1 is a positive integer.

In one embodiment, at least one of the antenna 452, the receiver 454, the multi-antenna receiving processor 458 or the receiving processor 456 is used to receive the first information in the present disclosure; at least one of the antenna 420, the transmitter 418, the multi-antenna transmitting processor 471 or the transmitting processor 416 is used to transmit the first information in the present disclosure.

In one embodiment, at least one of the antenna 452, the receiver 454, the multi-antenna receiving processor 458 or the receiving processor 456 is used to receive the second information in the present disclosure; at least one of the antenna 420, the transmitter 418, the multi-antenna transmitting processor 471 or the transmitting processor 416 is used to transmit the second information in the present disclosure.

In one embodiment, at least one of the antenna 452, the receiver 454, the multi-antenna receiving processor 458 or the receiving processor 456 is used to receive the third information in the present disclosure; at least one of the antenna 420, the transmitter 418, the multi-antenna transmitting processor 471 or the transmitting processor 416 is used to transmit the third information in the present disclosure.

Embodiment 5

Figure 5:
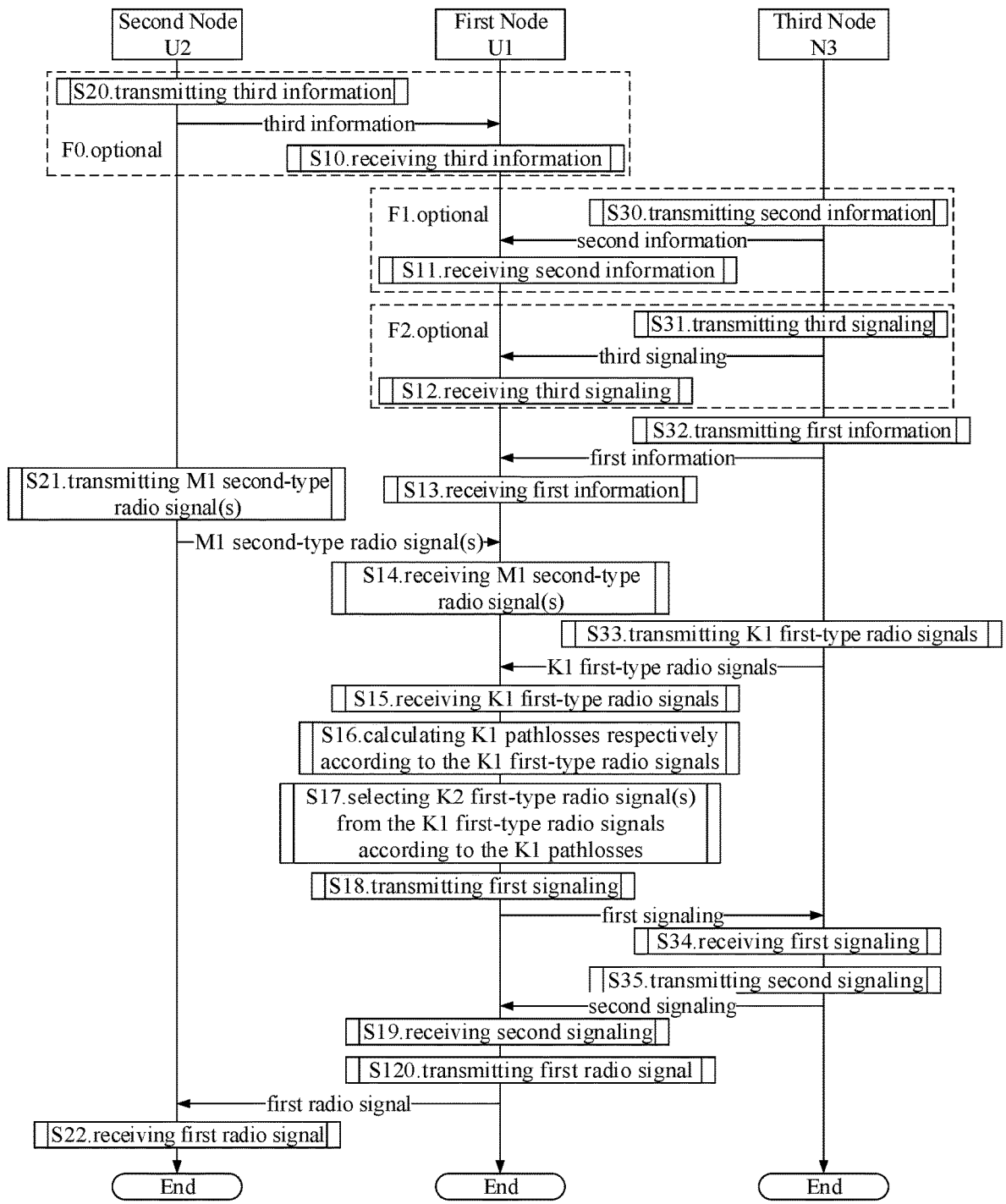
FIG. 5 illustrates a flowchart of a second signaling according to one embodiment of the present disclosure.

Embodiment 5 illustrates a flowchart of a second signaling, as shown in FIG. 5. In FIG. 5, a first node U1 and a second node U2 are in communication via sidelink, and a first node U1 and a third node N3 are in communication via a Uu interface.

In FIG. 5, steps respectively marked by F0, F1 and F2 are optional. Embodiments, subembodiments and subsidiary embodiments in Embodiment 5 are also applicable to Embodiment 6 if no conflict is incurred.

The first node U1 receives third information in step S10; receives second information in step S11; and receives a third signaling in step S12; receives first information in step S13; receives M1 second-type radio signal(s) in step S14; and receives K1 first-type radio signals in step S15; calculates K1 pathlosses respectively according to the K1 first-type radio signals in step S16; and selects the K2 first-type radio signal(s) from the K1 first-type radio signals according to the K1 pathlosses in step S17; transmits a first signaling in step S18; receives a second signaling in step S19; and transmits a first radio signal in step S120.

The second node U2 transmits third information in step S20; transmits M1 second-type radio signal(s) in step S21; and receives a first radio signal in step S22.

The third node N3 transmits second information in step S30; transmits a third signaling in step S31; and transmits first information in step S32; transmits K1 first-type radio signals in step S33; receives a first signaling in step S34; and transmits a second signaling in step S35.

In Embodiment 5, the K1 is a positive integer greater than 1, the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a receiver of the first radio signal comprises a second node U2, and a transmitter of the K1 first-type radio signals is a third node N3, the second node U2 being non-co-located with the third node N3; the third signaling is used to determine a transmitting power value of each first-type radio signal of the K1 first-type radio signals; the M1 second-type radio signal(s) is(are) respectively used to determine M1 pathloss(es), and the M1 pathloss(es) is(are) used to determine the K2 first-type radio signal(s) out of the K1 first-type radio signals; the first information is used to indicate K1 first-type factors, the K1 first-type radio signals are respectively used to determine K1 pathlosses, and K1 first-type parameters are obtained by respectively multiplying the K1 pathlosses by the K1 first-type factors; the K1 first-type parameters are used to determine the K2 first-type radio signal(s); the first information is transmitted via an air interface; the second information is used to indicate M1 second-type factor(s), the M1 second-type radio signal(s) is(are) respectively used to determine the M1 pathloss(es), and M1 second-type parameter(s) is(are) obtained by respectively multiplying the M1 pathloss(es) by the M1 second-type factor(s); the M1 second-type parameter(s) is(are) used to determine the K2 first-type radio signal(s); the second information is transmitted via an air interface; the third information is used to determine M1 second-type power value(s), and the M1 second-type radio signal(s) is(are) transmitted respectively employing the M1 second-type power value(s); the third information is transmitted via an air interface.

In one embodiment, the K3 is greater than 1, the K3 first-type radio signals respectively correspond to K3 first-type factors, and K3 first-type parameters are obtained by respectively multiplying the K3 pathlosses by the K3 first-type factors; a target parameter is a smallest first-type parameter of the K3 first-type parameters, and the target parameter is linear with a first reference power value, the first reference power value being used to determine the first power value.

In one subembodiment, the target parameter is measured by dB.

In one subembodiment, any of the K3 first-type factors is a real number no less than 0 and no greater than 1.

In one subembodiment, the K3 first-type parameters are equal to one another, and the target parameter is equal to a product of a target pathloss and a first-type parameter corresponding to the target pathloss, the target pathloss being a smallest one of the K3 pathlosses.

In one subembodiment, the first power value is obtained according to the following formula:

$$P = \min\{P_C, 10 \log M + P_1 + \min\{\alpha_1 PL_1, \alpha_2 PL_2, \ldots, \alpha_{K3} PL_{K3}\}\}$$

Herein the $P_C$ refers to $P_{CMAX,PSSCH}$ in TS36.213; the first reference power value is a polynomial $10 \log M + P_1 + \min\{\alpha_1 PL_1, \alpha_2 PL_2, \ldots, \alpha_{K3} PL_{K3}\}$; the target parameter is $\min\{\alpha_1 PL_1, \alpha_2 PL_2, \ldots, \alpha_{K3} PL_{K3}\}$; the M is related to a bandwidth occupied by the first radio signal represented by a number of REs; the $P_1$ is configured by a higher-layer signaling; the symbols from $\alpha_1$ to $\alpha_{K3}$ are respectively the K3 first-type factors, and the symbols from $PL_1$ to $PL_{K3}$ are respectively the K3 pathlosses.

In one subembodiment, the first power value is obtained according to the following formula:

$$P = 10 log_{10}\left(\frac{M}{M + 10^{\frac{3}{10}} \times M}\right) + \min\{P_{CMAX},$$
$$10 log_{10}\left(M + 10^{\frac{3}{10}} \times M\right) + P_1 + \min\{\alpha_1 PL_1, \alpha_2 PL_2, \ldots, \alpha_{K2} PL_{K3}\}\}$$

Herein, the $P_C$ refers to $P_{CMAX}$ in TS36.213; the first reference power value is a polynomial $$10 log_{10}\left(M + 10^{\frac{3}{10}} \times M\right) + P_1 + \min\{\alpha_1 PL_1, \alpha_2 PL_2, \ldots, \alpha_{K3} PL_{K3}\};$$

the target parameter is $\min\{\alpha_1 PL_1, \alpha_2 PL_2, \ldots, \alpha_{K3} PL_{K3}\}$; the M is related to a bandwidth occupied by the first radio signal represented by a number of REs; the $P_1$ is configured by a higher-layer signaling; the symbols from $\alpha_1$ to $\alpha_{K3}$ are respectively the K3 first-type factors, and the symbols from $PL_1$ to $PL_{K3}$ are respectively the K3 pathlosses.

In one subembodiment, the first power value is obtained according to the following formula:

$$P = 10 log_{10}\left(\frac{M}{M + 10^{\frac{3}{10}} \times M_1}\right) + A$$

Herein, the M is related to a bandwidth occupied by the first radio signal represented by a number of REs; the $M_1$ is equal to 2, or the $M_1$ is related to a bandwidth occupied by a PSCCH scheduling the first radio signal that is represented by a number of REs; and the first reference power value is a term of polynomial A.

In one subsidiary embodiment of the above subembodiment, an RRC signaling maxTxpower is configured, the polynomial A is equivalent to the following formula:

$$A = \min\{P_C, P_{MAX\_CBR},$$
$$10 log_{10}\left(M + 10^{\frac{3}{10}} \times M_1\right) + P_3 + \min\{\alpha_1 PL_1, \alpha_2 PL_2, \ldots, \alpha_{K3} PL_{K3}\}\}$$

Herein, the $P_C$ refers to $P_{CMAX}$ in TS36.213; the $P_{MAX\_CBR}$ is configured through the RRC signaling maxTxpower; the first reference power value is a polynomial $$10 log_{10}\left(M + 10^{\frac{3}{10}} \times M_1\right) + P_3 + \min\{\alpha_1 PL_1, \alpha_2 PL_2, \ldots, \alpha_{K3} PL_{K3}\};$$

the target parameter is $\min\{\alpha_1 PL_1, \alpha_2 PL_2, \ldots, \alpha_{K3} PL_{K3}\}$; the $P_3$ is configured by a higher-layer signaling; the symbols from $\alpha_1$ to $\alpha_{K3}$ are respectively the K3 first-type factors, and the symbols from $PL_1$ to $PL_{K3}$ are respectively the K3 pathlosses.

In one subsidiary embodiment of the above subembodiment, an RRC signaling maxTxpower is not configured, the polynomial A is equivalent to the following formula:

$$A = \min\{P_C,$$
$$10 log_{10}\left(M + 10^{\frac{3}{10}} \times M_1\right) + P_3 + \min\{\alpha_1 PL_1, \alpha_2 PL_2, \ldots, \alpha_{K3} PL_{K3}\}\}$$

The $P_C$ refers to $P_{CMAX}$ in TS36.213; the first reference power value is a polynomial $$10 log_{10}\left(M + 10^{\frac{3}{10}} \times M_1\right) + P_3 + \min\{\alpha_1 PL_1, \alpha_2 PL_2, \ldots, \alpha_{K3} PL_{K3}\};$$

the target parameter is $\min\{\alpha_1 PL_1, \alpha_2 PL_2, \ldots, \alpha_{K3} PL_{K3}\}$; the $P_3$ is configured by a higher-layer signaling; the symbols from $\alpha_1$ to $\alpha_{K3}$ are respectively the K3 first-type factors, and the symbols from $PL_1$ to $PL_{K3}$ are respectively the K3 pathlosses.

In one subembodiment, a linear correlation coefficient between the target parameter and the first power value is equal to 1.

In one subsidiary embodiment of the above subembodiment, a linear correlation coefficient between the target pathloss and the first power value is equal to a target factor corresponding to the target pathloss, the target factor is related to a target first-type radio signal associated with the target pathloss, and the target first-type radio signal is one of the K1 first-type radio signals being used to determine the target pathloss.

In one embodiment, a pathloss corresponding to any of the K2 first-type radio signal(s) is larger than a pathloss corresponding to any of the K1 first-type radio signals other than the K2 first-type radio signal(s).

In one embodiment, a pathloss corresponding to any of the K2 first-type radio signal(s) is larger than a specific threshold.

In one embodiment, the specific threshold in the present disclosure is measured by dB.

In one embodiment, the specific threshold in the present disclosure is determined through measurement.

In one embodiment, the K2 first-type radio signal(s) respectively corresponds (correspond) to K2 first-type factor(s), and K2 first-type parameter(s) is(are) obtained by respectively multiplying the K2 pathloss(es) by the K2 first-type factor(s); the K1 first-type radio signals respectively correspond to K1 first-type factors, and K1 first-type parameters are obtained by respectively multiplying the K1 pathlosses by the K1 first-type factors; any of the K2 first-type parameter(s) is no less than any of the K1 first-type parameters other than the K2 first-type parameter(s).

In one embodiment, the K2 first-type radio signal(s) respectively corresponds (correspond) to K2 first-type factor(s), and K2 first-type parameter(s) is(are) obtained by respectively multiplying the K2 pathloss(es) by the K2 first-type factor(s); the K1 first-type radio signals respectively correspond to K1 first-type factors, and K1 first-type parameters are obtained by respectively multiplying the K1 pathlosses by the K1 first-type factors; the K2 first-type parameter(s) is(are) K2 greatest first-type parameter(s) of the K1 first-type parameters.

In one embodiment, the K2 first-type radio signal(s) respectively corresponds (correspond) to K2 first-type factor(s), and K2 first-type parameter(s) is(are) obtained by respectively multiplying the K2 pathloss(es) by the K2 first-type factor(s); the K1 first-type radio signals respectively correspond to K1 first-type factors, and K1 first-type parameters are obtained by respectively multiplying the K1 pathlosses by the K1 first-type factors; each of the K2 first-type parameter(s) is greater than a target threshold, and the K2 first-type parameter(s) is(are) K2 smallest first-type parameter(s) of the K1 first-type parameters that is(are) greater than the target threshold; the target threshold is fixed, or the target threshold is configured by a higher-layer signaling, or the target threshold is equal to a maximum second-type parameter of the M1 second-type parameters of the present disclosure, or the target threshold is equal to a minimum second-type parameter of the M1 second-type parameters of the present disclosure.

In one embodiment, the K2 is equal to 1.

In one embodiment, a transmitting power value of any of the K1 first-type radio signals is fixed.

In one embodiment, the third signaling is used to determine K1 first-type power values, and the K1 first-type radio signals are transmitted respectively employing the K1 first-type power values.

In one embodiment, any of the K1 first-type power values is measured by dBm, or any of the K1 first-type power values is measured by W, or any of the K1 first-type power values is measured by mW.

In one embodiment, the M1 second-type radio signal(s) is(are) respectively associated with M1 second-type reference signal resource(s).

In one embodiment, a physical-layer channel occupied by any second-type radio signal of the M1 second-type radio signal(s) comprises a Physical Sidelink Discovery Channel (PSDCH).

In one embodiment, any of the M1 second-type radio signal(s) comprises at least one of a Primary Sidelink Synchronization Signal (PSSS) or a Secondary Sidelink Synchronization Signal (SSSS).

In one embodiment, any of the M1 second-type radio signal(s) comprises a Discovery Reference Signal (DRS).

In one embodiment, each of the M1 second-type radio signal(s) is transmitted on sidelink.

In one embodiment, any of the M1 pathloss(es) is measured by dB.

In one embodiment, the above phrase that the M1 second-type radio signal(s) is(are) respectively used to determine M1 pathloss(es) includes:
  transmitting power value(s) of the M1 second-type radio signal(s) is(are) M1 second-type power value(s) respectively; the M1 second-type power value(s) is(are) configured to the first node via a higher-layer signaling, or the M1 second-type power value(s) is(are) configured to the first node via a physical-layer signaling, or any of the M1 second-type power value(s) is fixed.

In one embodiment, the above phrase that the M1 second-type radio signal(s) is(are) respectively used to determine M1 pathloss(es) includes: transmitting power value(s) of the M1 second-type radio signal(s) is(are) M1 second-type power value(s) respectively, receiving power value(s) of the M1 second-type radio signal(s) at the first node is(are) respectively M1 second-type receiving power value(s), and the M1 pathloss(es) is(are) obtained by respectively subtracting the M1 second-type receiving power value(s) from the M1 second-type power value(s).

In one subembodiment of the above two embodiments, any of the M1 second-type power value(s) is measured by dBm, or any of the M1 second-type power value(s) is measured by W, or any of the M1 second-type power value(s) is measured by mW.

In one subembodiment, any of the M1 second-type receiving power value(s) is filtered by a higher-layer filter.

In one subembodiment, any of the M1 second-type receiving power value(s) is measured by dBm, or any of the M1 second-type receiving power value(s) is measured by W, or any of the M1 second-type receiving power value(s) is measured by mW.

In one embodiment, the M1 is equal to 1.

In one embodiment, the M1 second-type radio signal(s) is(are) transmitted on sidelink.

In one embodiment, the above phrase that the M1 pathloss(es) is(are) used to determine the K2 first-type radio signal(s) out of the K1 first-type radio signals includes: the K2 first-type radio signal(s) respectively corresponds (correspond) to the K2 pathloss(es), and any pathloss of the K2 pathloss(es) is larger than any of the M1 pathloss(es).

In one embodiment, the above phrase that the M1 pathloss(es) is(are) used to determine the K2 first-type radio signal(s) out of the K1 first-type radio signals includes: the K2 first-type radio signal(s) respectively corresponds (correspond) to the K2 pathloss(es), at least one pathloss of the K2 pathloss(es) is larger than any of the M1 pathloss(es).

In one embodiment, the above phrase that the M1 pathloss(es) is(are) used to determine the K2 first-type radio signal(s) out of the K1 first-type radio signals includes: the K2 first-type radio signal(s) respectively corresponds (correspond) to K2 first-type parameter(s) of the K1 first-type parameters; any first-type parameter of the K2 first-type parameter(s) is no less than any second-type parameter of the M1 second-type parameter(s), or at least one of the K2 first-type parameter(s) is no less than any second-type parameter of the M1 second-type parameter(s).

In one subembodiment, the K2 first-type parameter(s) is(are) greater than any of the M1 second-type parameter(s), and the K2 first-type parameter(s) is(are) K2 smallest first-type parameter(s) of the K1 first-type parameters.

In one embodiment, any first-type factor of the K1 first-type factors is a real number no greater than 1 and greater than 0.

In one subembodiment, the air interface in the present disclosure corresponds to an interface between the UE201 and the NR Node B 203 in Embodiment 2.

In one subembodiment, the air interface in the present disclosure corresponds to an interface between the UE201 and the UE241 in Embodiment 2.

In one subembodiment, the air interface in the present disclosure is carried by a wireless channel.

In one embodiment, the above phrase that the K1 first-type parameters are used to determine the K2 first-type radio signal(s) includes: K2 first-type parameter(s) respectively corresponding to the K2 first-type radio signal(s) is(are) K2 greatest first-type parameter(s) of the K1 first-type parameters.

In one embodiment, the above phrase that the K1 first-type parameters are used to determine the K2 first-type radio signal(s) includes: any of K2 first-type parameter(s) respectively corresponding to the K2 first-type radio signal(s) is no less than any of the K1 first-type parameters other than the K2 first-type parameter(s).

In one embodiment, any of the M1 second-type factor(s) is a real number no greater than 1 and greater than 0.

In one embodiment, the above phrase that the M1 second-type parameter(s) is(are) used to determine the K2 first-type radio signal(s) includes: any of K2 first-type parameter(s) respectively corresponding to the K2 first-type radio signal(s) is no less than any second-type parameter of the M1 second-type parameter(s).

In one embodiment, the above phrase that the M1 second-type parameter(s) is(are) used to determine the K2 first-type radio signal(s) includes: at least one of K2 first-type parameter(s) respectively corresponding to the K2 first-type radio signal(s) is no less than any second-type parameter of the M1 second-type parameter(s).

In one embodiment, any two second-type factors of the M1 second-type factors are equal.

In one embodiment, any second-type factor of the M1 second-type factor(s) is fixed.

In one embodiment, any second-type power value of the M1 second-type power value(s) is measured by dBm, or any second-type power value of the M1 second-type power value(s) is measured by W, or any second-type power value of the M1 second-type power value(s) is measured by mW.

In one embodiment, any second-type power value of the M1 second-type power value(s) is fixed.

In one embodiment, at least one of the K1 first-type radio signals is quasi-co-located with the first radio signal.

In one subembodiment, any of the K1 first-type radio signals is quasi-co-located with the first radio signal.

In one subembodiment, a given first-type radio signal is quasi-co-located with the first radio signal, the first node receives the given first-type radio signal employing given spatial Rx parameters, and the given spatial Rx parameters are used to determine an antenna port group of the first radio signal.

In one subembodiment, the first signaling and the first radio signal are transmitted employing a same antenna port group.

In one subembodiment, the two radio signals of the present disclosure being quasi-co-located means that all or part of large-scale properties of one of the two radio signals can be used to infer all or part of large-scale properties of the other of the two radio signals; the large-properties include one or more of Delay Spread, Doppler Spread, Doppler Shift, Path Loss or Average Gain.

Embodiment 6

Figure 6:
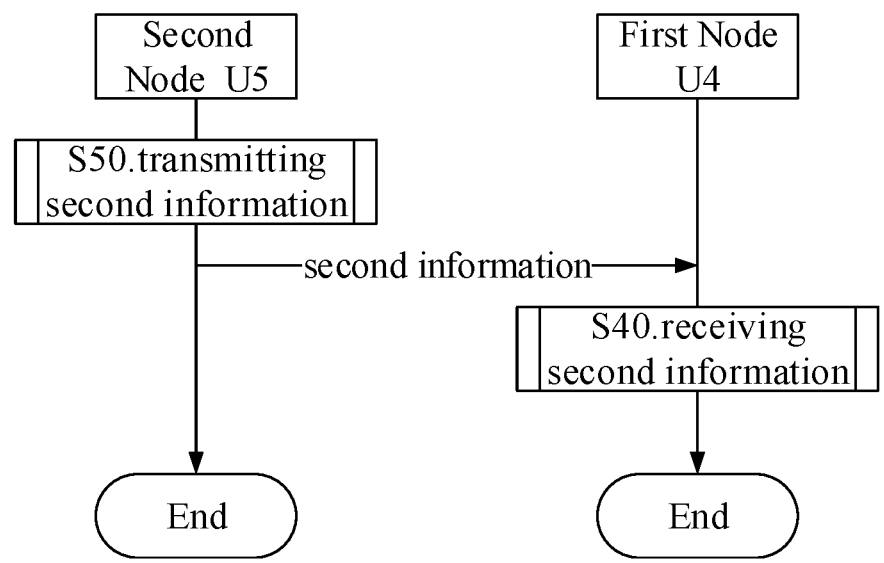
FIG. 6 illustrates a flowchart of second information according to one embodiment of the present disclosure.

Embodiment 6 illustrates a flowchart of second information, as shown in FIG. 6. In FIG. 6, a first node U4 and a second node U5 are in communication via sidelink.

The first node U4 receives second information in step S40.

The second node U5 transmits second information in step S50.

In Embodiment 6, the second information is used to indicate the M1 second-type factor(s) in the present disclosure, the M1 second-type radio signal(s) in the present disclosure is(are) respectively used to determine M1 pathloss(es), and M1 second-type parameter(s) is(are) obtained by respectively multiplying the M1 pathloss(es) by the M1 second-type factor(s); the M1 second-type parameter(s) is(are) used to determine the K2 first-type radio signal(s); the second information is transmitted via an air interface.

In one embodiment, the step S40 in Embodiment 6 can replace the step S11 in Embodiment 5, and the step S50 in Embodiment 6 can replace the step S30 in Embodiment 5.

Embodiment 7

Figure 7:
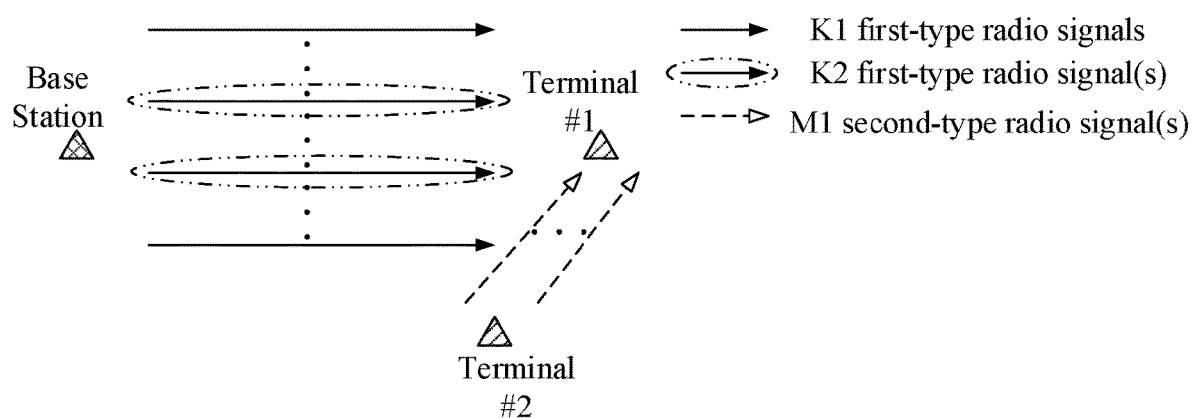
FIG. 7 illustrates a schematic diagram of K1 first-type radio signals and M1 second-type radio signal(s) according to one embodiment of the present disclosure.

Embodiment 7 illustrates a schematic diagram of K1 first-type radio signals and M1 second-type radio signal(s), as shown in FIG. 7. In FIG. 7, the K1 first-type radio signals are transmitted between a terminal #1 and a base station, while the M1 second-type radio signal(s) is(are) transmitted between a terminal #2 and the terminal #1, the terminal #1 transmitting the first radio signal in the present disclosure; the terminal #1 calculates K1 pathlosses respectively according to the K1 first-type radio signals, K2 first-type radio signal(s) identified by a broken box, as illustrated by FIG. 7, is(are) the K2 first-type radio signal(s) selected by the terminal #1 from the K1 first-type radio signals according to the K1 pathlosses; the K1 first-type radio signals respectively correspond to K1 first-type factors, and the terminal #1 acquires K1 pathlosses respectively according to the K1 first-type radio signals, and K1 first-type parameters are obtained by respectively multiplying the K1 pathlosses by the K1 first-type factors; the M1 second-type radio signal(s) respectively corresponds (correspond) to M1 second-type factor(s), and the terminal #1 acquires M1 pathloss(es) respectively according to the M1 second-type radio signal(s), and M1 second-type parameter(s) is(are) obtained by respectively multiplying the M1 pathloss(es) by the M1 second-type factor(s).

In one embodiment, the K1 first-type radio signals are transmitted on a Uu interface.

In one embodiment, the M1 second-type radio signal(s) is(are) transmitted on a PC-5 interface.

In one embodiment, the K2 first-type radio signal(s) respectively corresponds (correspond) to K2 first-type factor(s), and K2 first-type parameter(s) is(are) obtained by respectively multiplying the K2 pathloss(es) by the K2 first-type parameter(s); any first-type parameter of the K2 first-type parameter(s) is no less than any of the K1 first-type parameters other than the K2 first-type parameter(s).

In one embodiment, the K2 first-type radio signal(s) respectively corresponds (correspond) to K2 first-type factor(s), and K2 first-type parameter(s) is(are) obtained by respectively multiplying the K2 pathloss(es) by the K2 first-type parameter(s); the K2 first-type parameter(s) is(are) K2 greatest first-type parameter(s) of the K1 first-type parameters.

In one embodiment, the K2 first-type radio signal(s) respectively corresponds (correspond) to K2 first-type factor(s), and K2 first-type parameter(s) is(are) obtained by respectively multiplying the K2 pathloss(es) by the K2 first-type parameter(s); each of the K2 first-type parameter(s) is greater than a target threshold, and the K2 first-type parameter(s) is(are) K2 smallest first-type parameter(s) of the K1 first-type parameters that is(are) greater than the target threshold; the target threshold is fixed, or the target threshold is configured by a higher-layer signaling, or the target threshold is equal to a maximum second-type parameter of the M1 second-type parameters, or the target threshold is equal to a minimum second-type parameter of the M1 second-type parameters.

In one embodiment, the terminal #1 corresponds to the first node in the present disclosure, the terminal #2 corresponds to the second node in the present disclosure, and the base station corresponds to the third node in the present disclosure.

Embodiment 8

Figure 8:
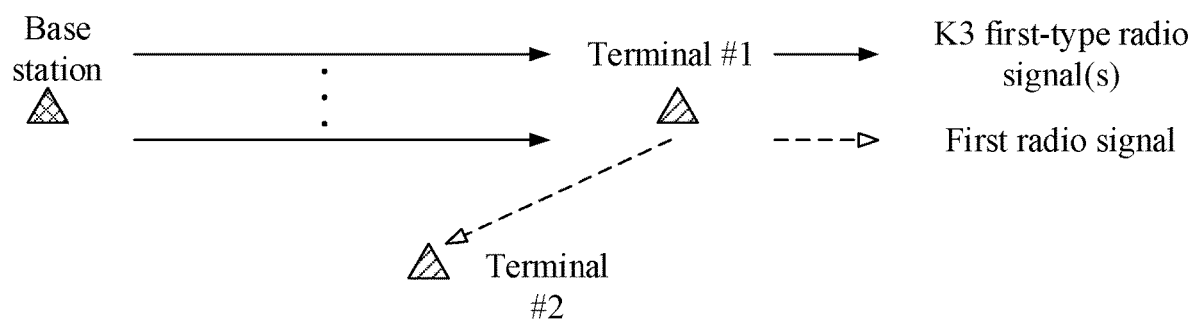
FIG. 8 illustrates a schematic diagram of K3 first-type radio signal(s) and a first radio signal according to one embodiment of the present disclosure.

Embodiment 8 illustrates a schematic diagram of K3 first-type radio signal(s) and a first radio signal, as shown in FIG. 8. In FIG. 8, a base station determines K3 first-type radio signal(s) via a second signaling for the terminal #1. The K3 first-type radio signal(s) respectively corresponds (correspond) to K3 pathloss(es), and the K3 first-type radio signal(s) respectively corresponds (correspond) to K3 first-type factor(s). K3 first-type parameter(s) is(are) obtained by respectively multiplying the K3 pathloss(es) by the K3 first-type factor(s), and the K3 first-type parameter(s) is(are) used to determine a transmitting power value of the first radio signal.

In one embodiment, a smallest first-type parameter of the K3 first-type parameters is used by the terminal #1 for determining a transmitting power value of the first radio signal.

In one embodiment, the terminal #1 autonomously selects a first-type parameter from the K3 first-type parameters and determines a transmitting power value of the first radio signal according to the selected first-type parameter.

In one embodiment, a greatest first-type parameter of the K3 first-type parameters is used by the terminal #1 for determining a transmitting power value of the first radio signal.

Embodiment 9

Figure 9:
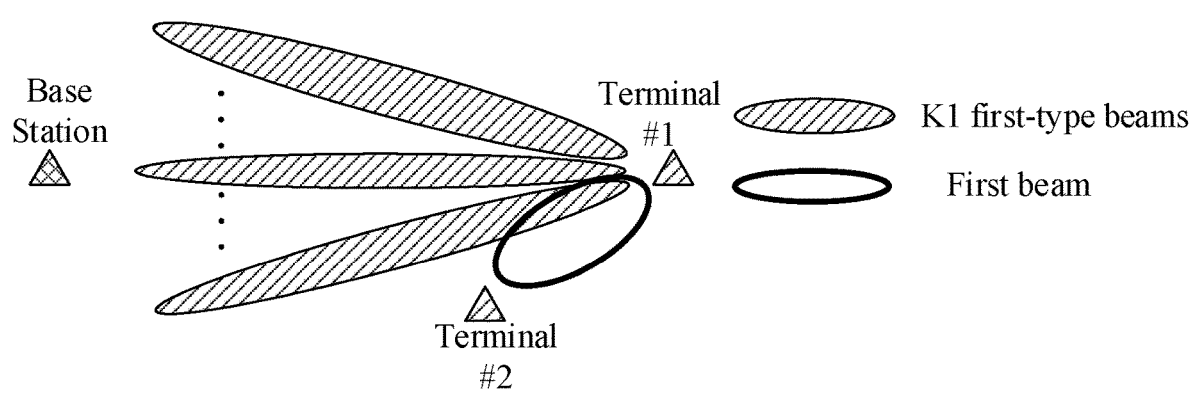
FIG. 9 illustrates a spatial schematic diagram of K1 first-type radio signals and a first radio signal according to one embodiment of the present disclosure.

Embodiment 9 illustrates a spatial schematic diagram of K1 first-type radio signals and a first radio signal, as shown in FIG. 9. In FIG. 9, the K1 first-type radio signals are transmitted respectively employing K1 first-type antenna port groups, the K1 first-type antenna port groups respectively corresponding to K1 spatial Rx parameter groups, and the first radio signal is transmitted employing a first antenna port group; K1 first-type beams illustrated by FIG. 9 respectively correspond to K1 transmission beamforming vectors respectively corresponding to K1 first-type antenna port groups, or K1 first-type beams illustrated by FIG. 9 respectively correspond to K1 reception beamforming vectors respectively formed through K1 spatial Rx parameter groups; a first beam illustrated in FIG. 9 corresponds to a transmission beamforming vector corresponding to the first antenna port group.

In one embodiment, at least one of the K1 first-type antenna port groups corresponds to a transmission beamforming vector that is related to a transmission beamforming vector corresponding to the first antenna port group.

In one embodiment, at least one of the K1 spatial Rx parameter groups corresponds to a reception beamforming vector that is related to a transmission beamforming vector corresponding to the first antenna port group.

In one embodiment, a transmission beamforming vector corresponding to any of the K1 first-type antenna port groups is related to a transmission beamforming vector corresponding to the first antenna port group.

In one embodiment, a reception beamforming vector corresponding to any of the K1 spatial Rx parameter groups is related to a transmission beamforming vector corresponding to the first antenna port group.

In one embodiment, a spatial coverage of a transmission beamforming vector corresponding to any of the K1 first-type antenna port groups is overlapped with a spatial coverage of a transmission beamforming vector corresponding to the first antenna port group.

In one embodiment, a spatial coverage of a reception beamforming vector corresponding to any of the K1 spatial Rx parameter groups is overlapped with a spatial coverage of a transmission beamforming vector corresponding to the first antenna port group.

In one embodiment, the beamforming vector in the present disclosure comprises at least one of an analog beamforming vector, a digital beamforming vector, an analog beamforming matrix or a digital beamforming matrix.

Embodiment 10

Figure 10:
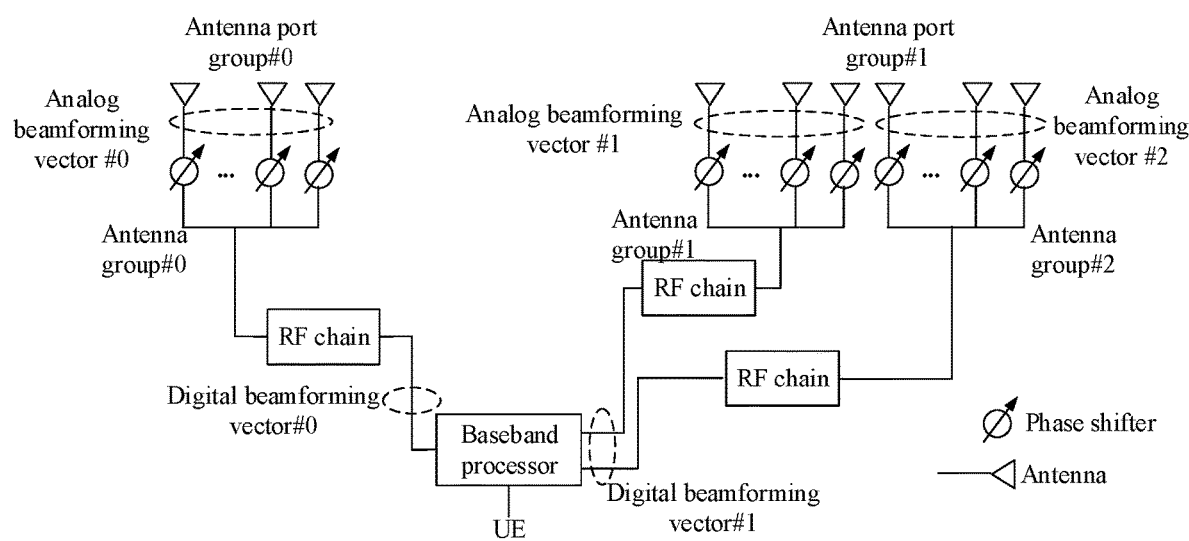
FIG. 10 illustrates a schematic diagram of antenna ports and antenna port groups according to one embodiment of the present disclosure.

Embodiment 10 illustrates a schematic diagram of antenna ports and antenna port groups, as shown in FIG. 10.

In Embodiment 10, an antenna port group comprises a positive integer number of antenna port(s); an antenna port is formed by superimposing antennas in a positive integer number of antenna group(s) through antenna virtualization; an antenna group comprises a positive integer number of antenna(s). An antenna group is connected to a baseband processor via a Radio Frequency (RF) chain, so different antenna groups correspond to different RF chains. Mapping coefficients of all antennas in a positive integer number of antenna group(s) comprised by a given antenna port to the given antenna port constitute a beamforming vector corresponding to the given antenna port. Mapping coefficients of multiple antennas in any given antenna group among a positive integer number of antenna group(s) comprised by the given antenna port to the given antenna port constitute an analog beamforming vector of the given antenna group. Analog beamforming vector(s) respectively corresponding to the positive integer number of antenna group(s) comprised by the given antenna port is(are) diagonally arranged to form an analog beamforming matrix corresponding to the given antenna port. Mapping coefficient(s) of the positive integer number of antenna group(s) comprised by the given antenna port to the given antenna port constitutes (constitute) a digital beamforming vector corresponding to the given antenna port. A beamforming vector corresponding to the given antenna port is a product of an analog beamforming matrix corresponding to the given antenna port and a digital beamforming vector corresponding to the given antenna port. Each of antenna ports in an antenna port group is composed of (a) same antenna group(s), while different antenna ports in a same antenna port group correspond to different beamforming vectors.

Two antenna port groups are presented in FIG. 10, which are antenna port group #0 and antenna port group #1. Herein, the antenna port group #0 is composed of antenna group #0, while the antenna port group #1 is composed of antenna group #1 and antenna group #2. Mapping coefficients of multiple antennas in the antenna group #0 to the antenna port group #0 constitute an analog beamforming vector #0, while a mapping coefficient of the antenna group #0 to the antenna port group #0 constitutes a digital beamforming vector #0. Mapping coefficients of multiple antennas in the antenna group #1 and of multiple antennas in the antenna group #2 to the antenna port group #1 respectively constitute an analog beamforming vector #1 and an analog beamforming vector #2; and mapping coefficients of the antenna group #1 and of the antenna group #2 to the antenna port group #1 constitute a digital beamforming vector #1. A beamforming vector corresponding to any antenna port in the antenna port group #0 is a product of the analog beamforming vector #0 and the digital beamforming vector #0. A beamforming vector corresponding to any antenna port in the antenna port group #1 is a product of the digital beamforming vector #1 and an analog beamforming matrix formed by diagonally arranging of the analog beamforming vector #1 and the analog beamforming vector #2.

In one embodiment, an antenna port group comprises one antenna port, for instance, the antenna port group #0 in FIG. 10 comprises an antenna port.

In one subembodiment, an analog beamforming matrix corresponding to the antenna port is dimensionally reduced to an analog beamforming vector, and a digital beamforming vector corresponding to the antenna port is dimensionally reduced to a scaler, and a beamforming vector corresponding to the antenna port is equivalent to an analog beamforming vector corresponding to the antenna port. For example, the digital beamforming vector #0 in FIG. 10 is dimensionally reduced to a scaler, and a beamforming vector corresponding to an antenna port in the antenna port group #0 is the analog beamforming vector #0.

In one embodiment, an antenna port group comprises multiple antenna ports, for example, the antenna port group #1 in FIG. 10 comprises multiple antenna ports.

In one subembodiment, the multiple antenna ports correspond to a same analog beamforming matrix and different digital beamforming vectors.

In one embodiment, antenna ports in different antenna port groups correspond to different analog beamforming matrixes.

In one embodiment, any two antenna ports in an antenna port group are Quasi-Co-located (QCL).

In one subembodiment, two antenna ports being QCL means that all or part of large-scale properties of a radio signal transmitted from one of the two antenna ports can be used to infer all or part of large-scale properties of a radio signal transmitted from the other of the two antenna ports; the large-scale properties include one or more of Delay Spread, Doppler Spread, Doppler Shift, Path Loss or Average Gain.

In one embodiment, any two antenna ports in an antenna port group are spatial QCL.

In one embodiment, the K1 first-type radio signals respectively correspond to K1 first-type identifiers, each of the K1 first-type identifiers being used to determine an antenna port group.

In one embodiment, the K1 first-type radio signals respectively correspond to K1 first-type identifiers, and the K1 first-type radio signals respectively correspond to K1 first-type reference signal resources, each of the K1 first-type identifiers being used to determine a first-type reference signal resource.

In one embodiment, the M1 second-type radio signal(s) respectively corresponds (correspond) to M1 second-type identifier(s), each of the M1 second-type identifier(s) being used to determine an antenna port group.

In one embodiment, the M1 second-type radio signal(s) respectively corresponds (correspond) to M1 second-type identifier(s), and the M1 second-type radio signal(s) respectively corresponds (correspond) to M1 second-type reference signal resource(s), each of the M1 second-type identifier(s) being used to determine a second-type reference signal resource.

In one subembodiment, any of the K1 first-type reference signal resources is used for channel measurement on a cellular link.

In one subembodiment, any of the M1 second-type reference signal resource(s) is used for channel measurement on a sidelink.

In one embodiment, a pattern employed by any of the K1 first-type radio signals is the same as a CSI-RS.

In one embodiment, a pattern employed by any of the M1 second-type radio signal(s) is the same as a CSI-RS.

In one embodiment, a pattern employed by any of the M1 second-type radio signal(s) is the same as a Sounding Reference Signal (SRS).

In one embodiment, any of the K1 first-type radio signals comprises a Demodulation Reference Signal (DMRS).

In one embodiment, any of the M1 second-type radio signal(s) comprises a DMRS.

In one embodiment, a pattern employed by any of the K1 first-type radio signals is the same as a DMRS.

In one embodiment, a pattern employed by any of the M1 second-type radio signal(s) is the same as a DMRS.

In one embodiment, the phrase that each of the K1 first-type identifiers is used to determine an antenna port group includes: each of the K1 first-type identifiers is indicated by a TCI.

In one subembodiment, the TCI is a field of SCI.

In one embodiment, the K1 first-type radio signals respectively correspond to K1 first-type identifiers, the phrase that each of the K1 first-type identifiers is used to determine an antenna port group includes: each of the K1 first-type identifiers is indicated by an SRS Resource Indicator (SRI).

In one subembodiment, the SRI is a field of SCI.

In one embodiment, the antenna port group in the present disclosure comprises a positive integer number of antenna port(s).

In one embodiment, the antenna port group in the present disclosure corresponds to a group of RS resources.

In one subembodiment, the RS is used for channel measurement on sidelink.

In one subembodiment, the RS is used for channel measurement of a radio signal between terminals.

In one subembodiment, the RS comprises a CSI-RS.

In one subembodiment, the RS comprises a DMRS.

In one subembodiment, the RS comprises an SRS.

Embodiment 11

Figure 11:
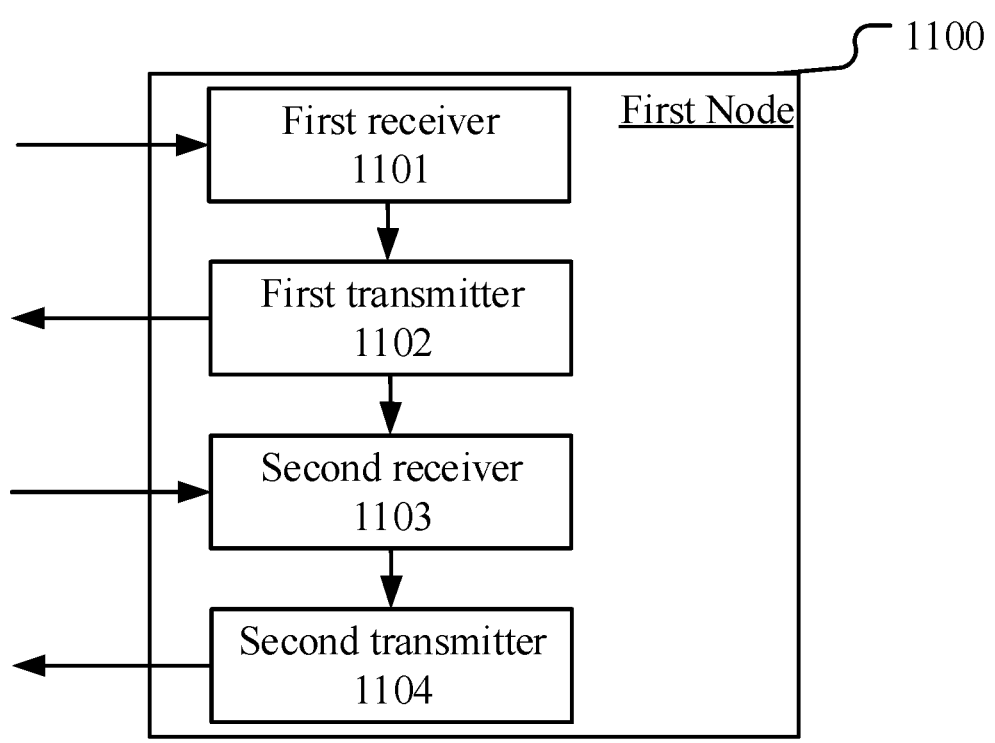
FIG. 11 illustrates a structure block diagram of a processing device in a first node according to one embodiment of the present disclosure.

Embodiment 11 illustrates a structure block diagram of a processing device in a first node, as shown in FIG. 11. In FIG. 11, a first node's processing device 1100 comprises a first receiver 1101, a first transmitter 1102, a second receiver 1103 and a second transmitter 1104.

The first receiver 1101 receives K1 first-type radio signals, K1 being a positive integer greater than 1.

The first transmitter 1102 transmits a first signaling.

The second receiver 1103 receives a second signaling.

The second transmitter 1104 transmits a first radio signal.

In Embodiment 11, the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a receiver of the first radio signal includes a second node, and a transmitter of the K1 first-type radio signals is a third node, the second node being non-co-located with the third node.

In one embodiment, the K3 is greater than 1, the K3 first-type radio signals respectively correspond to K3 first-type factors, and K3 first-type parameters are obtained by respectively multiplying the K3 pathlosses by the K3 first-type factors; a target parameter is a smallest first-type parameter of the K3 first-type parameters, and the target parameter is linear with a first reference power value, the first reference power value being used to determine the first power value.

In one embodiment, the first receiver 1101 also calculates K1 pathlosses respectively according to the K1 first-type radio signals; the first transmitter 1102 also selects the K2 first-type radio signal(s) from the K1 first-type radio signals according to the K1 pathlosses.

In one embodiment, the first receiver 1101 also receives a third signaling; the third signaling is used to determine a transmitting power value of each of the K1 first-type radio signals.

In one embodiment, the first receiver 1101 also receives M1 second-type radio signal(s), M1 being a positive integer; the M1 second-type radio signal(s) is(are) respectively used to determine M1 pathloss(es), and the M1 pathloss(es) is(are) used to determine the K2 first-type radio signal(s) out of the K1 first-type radio signals.

In one embodiment, the first receiver 1101 also receives first information; the first information is used to indicate K1 first-type factors, the K1 first-type radio signals are respectively used to determine K1 pathlosses, and K1 first-type parameters are obtained by respectively multiplying the K1 pathlosses by the K1 first-type factors; the K1 first-type parameters are used to determine the K2 first-type radio signal(s); the first information is transmitted via an air interface.

In one embodiment, the first receiver 1101 also receives second information; the second information is used to indicate M1 second-type factor(s), the M1 second-type radio signal(s) is(are) respectively used to determine the M1 pathloss(es), and M1 second-type parameter(s) is(are) obtained by respectively multiplying the M1 pathloss(es) by the M1 second-type factor(s); the M1 second-type parameter(s) is(are) used to determine the K2 first-type radio signal(s); the second information is transmitted via an air interface.

In one embodiment, the first receiver 1101 also receives third information; the third information is used to determine M1 second-type power value(s), and the M1 second-type radio signal(s) is(are) transmitted respectively employing the M1 second-type power value(s); the third information is transmitted via an air interface.

In one embodiment, at least one of the K1 first-type radio signals is quasi-co-located with the first radio signal.

In one embodiment, the first receiver 1101 comprises at least the first four of the antenna 452, the receiver 454, the multi-antenna receiving processor 458, the receiving processor 456 and the controller/processor 459 in Embodiment 4.

In one embodiment, the first transmitter 1102 comprises at least the first four of the antenna 452, the transmitter 454, the multi-antenna transmitting processor 457, the transmitting processor 468 and the controller/processor 459 in Embodiment 4.

In one embodiment, the second receiver 1103 comprises at least the first four of the antenna 452, the receiver 454, the multi-antenna receiving processor 458, the receiving processor 456 and the controller/processor 459 in Embodiment 4.

In one embodiment, the second transmitter 1104 comprises at least the first four of the antenna 452, the transmitter 454, the multi-antenna transmitting processor 457, the transmitting processor 468 and the controller/processor 459 in Embodiment 4.

Embodiment 12

Figure 12:
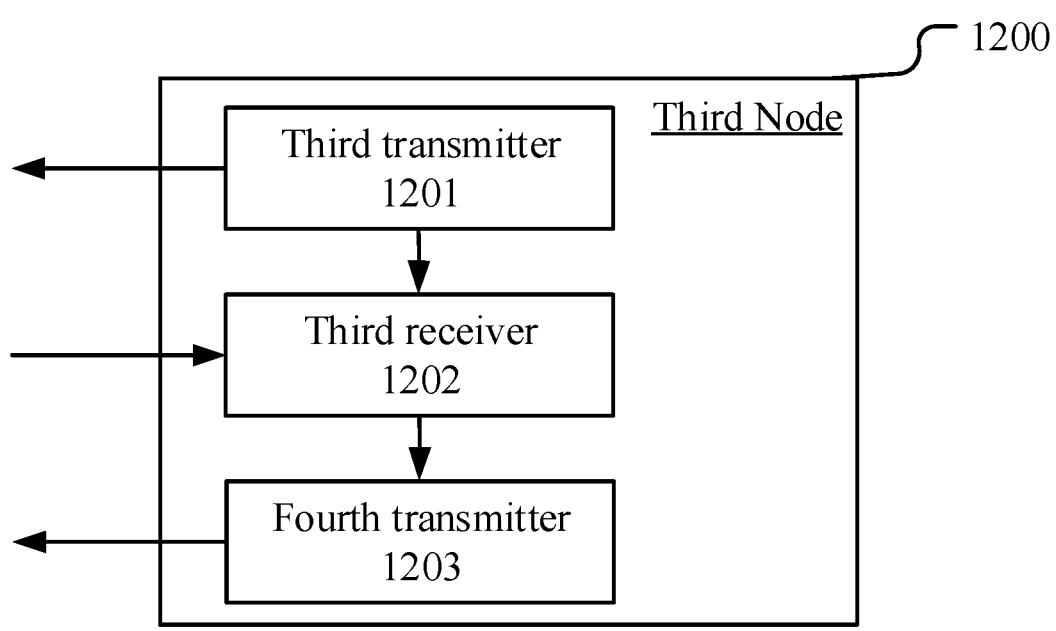
FIG. 12 illustrates a structure block diagram of a processing device in a third node according to one embodiment of the present disclosure.

Embodiment 12 illustrates a structure block diagram of a processing device in a third node, as shown in FIG. 12. In FIG. 12, a third node's processing device 1200 comprises a third transmitter 1201, a third receiver 1202 and a fourth transmitter 1203.

The third transmitter 1201 transmits K1 first-type radio signals, K1 being a positive integer greater than 1.

The third receiver 1202 receives a first signaling.

The fourth transmitter 1203 transmits a second signaling.

In Embodiment 12, the first signaling is used to indicate K2 first-type radio signal(s) out of the K1 first-type radio signals, K2 being a positive integer no greater than the K1; the second signaling is used to indicate K3 first-type radio signal(s) out of the K1 first-type radio signals, K3 being a positive integer no greater than the K1; the first signaling is used by the third node for determining the K3 first-type radio signal(s); the K3 first-type radio signal(s) is(are) respectively used to determine K3 pathloss(es), and the K3 pathloss(es) is(are) used to determine a first power value, a transmitting power value of a first radio signal being the first power value; a receiver of the first radio signal includes a second node, and a transmitter of the first signaling transmits the first radio signal, the second node being non-co-located with the third node.

In one embodiment, the K3 is greater than 1, the K3 first-type radio signals respectively correspond to K3 first-type factors, and K3 first-type parameters are obtained by respectively multiplying the K3 pathlosses by the K3 first-type factors; a target parameter is a smallest first-type parameter of the K3 first-type parameters, and the target parameter is linear with a first reference power value, the first reference power value being used by a transmitter of the first signaling for determining the first power value.

In one embodiment, the third transmitter 1201 also transmits a third signaling; the third signaling is used to determine a transmitting power value of each of the K1 first-type radio signals.

In one embodiment, the third transmitter 1201 also transmits first information; the first information is used to indicate K1 first-type factors, the K1 first-type radio signals are respectively used to determine K1 pathlosses, and K1 first-type parameters are obtained by respectively multiplying the K1 pathlosses by the K1 first-type factors; the K1 first-type parameters are used by the transmitter of the first signaling for determining the K2 first-type radio signal(s); the first information is transmitted via an air interface.

In one embodiment, the third transmitter 1201 also transmits second information; the second information is used to indicate M1 second-type factor(s), the M1 second-type factor(s) is(are) respectively associated with M1 second-type radio signal(s), and the M1 second-type radio signal(s) is(are) respectively used to determine M1 pathloss(es), and M1 second-type parameter(s) is(are) obtained by respectively multiplying the M1 pathloss(es) by the M1 second-type factor(s); the M1 second-type parameter(s) is(are) used by the transmitter of the first signaling for determining the K2 first-type radio signal(s); a transmitter of the M1 second-type radio signal(s) is communications equipment other than the third node; the second information is transmitted via an air interface.

In one embodiment, at least one of the K1 first-type radio signals is quasi-co-located with the first radio signal.

In one embodiment, the third transmitter 1201 comprises at least the first four of the antenna 420, the transmitter 418, the multi-antenna transmitting processor 471, the transmitting processor 416 and the controller/processor 475 in Embodiment 4.

In one embodiment, the third receiver 1202 comprises at least the first four of the antenna 420, the receiver 418, the multi-antenna receiving processor 472, the receiving processor 470 and the controller/processor 475 in Embodiment 4.

In one embodiment, the fourth transmitter 1203 comprises at least the first four of the antenna 420, the transmitter 418, the multi-antenna transmitting processor 471, the transmitting processor 416 and the controller/processor 475 in Embodiment 4.

Embodiment 13

Figure 13:
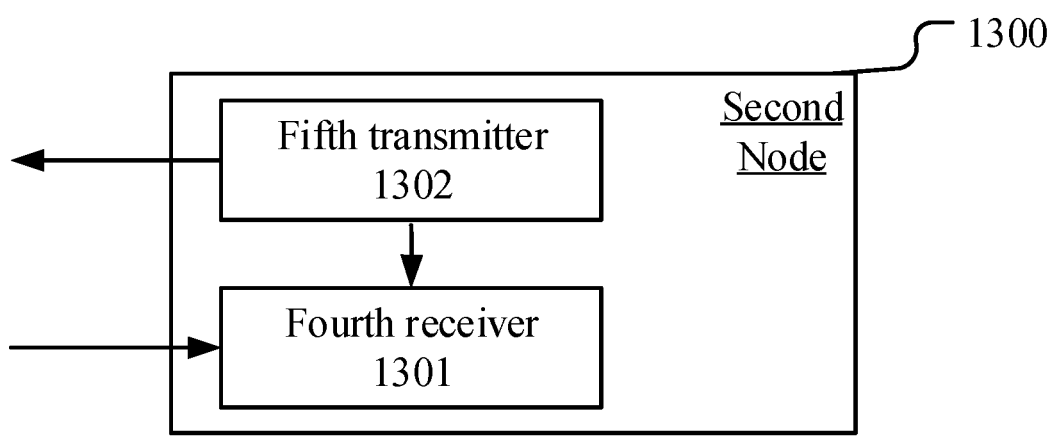
FIG. 13 illustrates a structure block diagram of a processing device in a second node according to one embodiment of the present disclosure.

Embodiment 13 illustrates a structure block diagram of a processing device in a second node, as shown in FIG. 13. In FIG. 13, a second node's processing device 1300 comprises a fourth receiver 1301 and a fifth transmitter 1302. Herein, the fifth transmitter 1302 is optional.

The fourth receiver 1301 receives a first radio signal.

The fifth transmitter 1302 transmits M1 second-type radio signal(s), M1 being a positive integer.

In Embodiment 13, a first signaling is used to indicate K2 first-type radio signal(s) out of the K1 first-type radio signals, K2 being a positive integer no greater than the K1; a second signaling is used to indicate K3 first-type radio signal(s) out of the K1 first-type radio signals, K3 being a positive integer no greater than the K1; the first signaling is used by a transmitter of the second signaling for determining the K3 first-type radio signal(s); the K3 first-type radio signal(s) is(are) respectively used to determine K3 pathloss(es), and the K3 pathloss(es) is(are) used to determine a first power value, a transmitting power value of the first radio signal being the first power value; a transmitter of the K1 first-type radio signals is a third node, the second node being non-co-located with the third node; the M1 second-type radio signal(s) is(are) respectively used to determine M1 pathloss(es), and the M1 pathloss(es) is(are) used to determine the K2 first-type radio signal(s) out of the K1 first-type radio signals.

In one embodiment, the K3 is greater than 1, the K3 first-type radio signals respectively correspond to K3 first-type factors, and K3 first-type parameters are obtained by respectively multiplying the K3 pathlosses by the K3 first-type factors; a target parameter is a smallest first-type parameter of the K3 first-type parameters, and the target parameter is linear with a first reference power value, the first reference power value being used by a transmitter of the first radio signal for determining the first power value.

In one embodiment, the fifth transmitter 1302 also transmits M1 second-type radio signal(s), M1 being a positive integer; the M1 second-type radio signal(s) is(are) respectively used to determine M1 pathloss(es), and the M1 pathloss(es) is(are) used by a transmitter of the first radio signal for determining the K2 first-type radio signal(s) out of the K1 first-type radio signals.

In one embodiment, the fifth transmitter 1302 also transmits second information; the second information is used to indicate M1 second-type factor(s), the M1 second-type radio signal(s) is(are) respectively used to determine the M1 pathloss(es), and M1 second-type parameter(s) is(are) obtained by respectively multiplying the M1 pathloss(es) by the M1 second-type factor(s); the M1 second-type parameter(s) is(are) used by a transmitter of the first radio signal for determining the K2 first-type radio signal(s); the second information is transmitted via an air interface.

In one embodiment, the fifth transmitter 1302 also transmits third information; the third information is used to determine M1 second-type power value(s), and the M1 second-type radio signal(s) is(are) transmitted respectively employing the M1 second-type power value(s); the third information is transmitted via an air interface.

In one embodiment, at least one of the K1 first-type radio signals is quasi-co-located with the first radio signal.

In one embodiment, the fourth receiver 1301 comprises at least the first four of the antenna 420, the receiver 418, the multi-antenna receiving processor 472, the receiving processor 470 and the controller/processor 475 in Embodiment 4.

In one embodiment, the fifth transmitter 1302 comprises at least the first four of the antenna 420, the transmitter 418, the multi-antenna transmitting processor 471, the transmitting processor 416 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced Machine Type Communication (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced Machine Type Communication (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced Machine Type Communication (eMTC) terminals, NB-IOT terminals, vehicle-mounted communication equipment, aircrafts, airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
   receiving K1 first-type radio signals, the K1 first-type radio signals are Channel State Information Reference Signal (CSI-RS), K1 being a positive integer greater than 1;
   transmitting a first signaling;
   receiving a second signaling; and transmitting a first radio signal; wherein:
the first signaling is used to indicate K2 first-type radio signal(s) out of the K1 first-type radio signals, K2 being a positive integer no greater than the K1;
the second signaling is used to indicate K3 first-type radio signal(s) out of the K1 first-type radio signals, K3 being a positive integer no greater than the K1; the second signaling comprises K3 CSI-RS Resource Index(es) (CRI(s)), the K3 CRI(s) being respectively associated with the K3 first-type reference signal resource(s); the K3 first-type radio signal(s) respectively corresponds (correspond) to K3 Transmission Configuration Indication(s);
the first signaling is used by a transmitter of the second signaling for determining the K3 first-type radio signal(s);
the K3 first-type radio signal(s) is(are) respectively used to determine K3 pathloss(es), and the K3 pathloss(es) is(are) used to determine a first power value, a transmitting power value of the first radio signal being the first power value;
a receiver of the first radio signal includes a second node, and a transmitter of the K1 first-type radio signals is a third node, the second node being non-co-located with the third node;
the K1 first-type radio signals are respectively transmitted in K1 first-type reference signal resources; and
the first signaling is used to indicate K2 first-type reference signal resource(s) out of the K1 first-type reference signal resources, while the second signaling is used to indicate K3 first-type reference signal resource(s) out of the K1 first-type reference signal resources;
the K1 first-type radio signals are transmitted respectively employing K1 first-type antenna port groups, the K1 first-type antenna port groups respectively corresponding to K1 spatial Rx parameter groups; the third node is a base station and the second node is a UE; the first node and the second node are in communication via sidelink, and the first node and the third node are in communication via a Uu interface.

2. The first node according to claim 1, wherein:
the K1 first-type reference signal resources respectively correspond to K1 CRIs;
the first signaling comprises K2 CRI(s), the K2 CRI(s) being respectively associated with the K2 first-type reference signal resource(s).

3. A first node for wireless communications, comprising:
a first receiver, which receives K1 first-type radio signals, the K1 first-type radio signals are Channel State Information Reference Signal (CSI-RS), K1 being a positive integer greater than 1;
a first transmitter, which transmits a first signaling;
a second receiver, which receives a second signaling; and
a second transmitter, which transmits a first radio signal; wherein:
the first signaling is used to indicate K2 first-type radio signal(s) out of the K1 first-type radio signals, K2 being a positive integer no greater than the K1;
the second signaling is used to indicate K3 first-type radio signal(s) out of the K1 first-type radio signals, K3 being a positive integer no greater than the K1; the second signaling comprises K3 CSI-RS Resource Index(es) (CRI(s)), the K3 CRI(s) being respectively associated with the K3 first-type reference signal resource(s); the K3 first-type radio signal(s) respectively corresponds (correspond) to K3 Transmission Configuration Indication(s);

the first signaling is used by a transmitter of the second signaling for determining the K3 first-type radio signal(s);
the K3 first-type radio signal(s) is(are) respectively used to determine K3 pathloss(es);
the K3 pathloss(es) is(are) used to determine a first power value, a transmitting power value of the first radio signal being the first power value;
a receiver of the first radio signal includes a second node;
a transmitter of the K1 first-type radio signals is a third node, the second node being non-co-located with the third node;
the K1 first-type radio signals are respectively transmitted in K1 first-type reference signal resources; and
the first signaling is used to indicate K2 first-type reference signal resource(s) out of the K1 first-type reference signal resources, while the second signaling is used to indicate K3 first-type reference signal resource(s) out of the K1 first-type reference signal resources;
the K1 first-type radio signals are transmitted respectively employing K1 first-type antenna port groups, the K1 first-type antenna port groups respectively corresponding to K1 spatial Rx parameter groups; the third node is a base station and the second node is a UE; the first node and the second node are in communication via sidelink, and the first node and the third node are in communication via a Uu interface.

4. The first node according to claim 3, wherein:
the K3 is greater than 1, the K3 first-type radio signals respectively corresponding to K3 first-type factors, and K3 first-type parameters being obtained by respectively multiplying the K3 pathlosses by the K3 first-type factors;
a target parameter is a smallest first-type parameter of the K3 first-type parameters;
the target parameter is linear with a first reference power value, the first reference power value being used to determine the first power value;
the K1 first-type reference signal resources respectively correspond to K1 CRIs;
the first signaling comprises K2 CRI(s), the K2 CRI(s) being respectively associated with the K2 first-type reference signal resource(s).

5. The first node according to claim 3, wherein the first receiver calculates K1 pathlosses respectively according to the K1 first-type radio signals; the first transmitter selects the K2 first-type radio signal(s) from the K1 first-type radio signals according to the K1 pathlosses.

6. The first node according to claim 3, wherein the first receiver receives a third signaling; the third signaling is used to determine a transmitting power value of each first-type radio signal of the K1 first-type radio signals.

7. The first node according to claim 3, wherein the first receiver receives M1 second-type radio signal(s), M1 being a positive integer; the M1 second-type radio signal(s) is(are) respectively used to determine M1 pathloss(es), and the M1 pathloss(es) is(are) used to determine the K2 first-type radio signal(s) out of the K1 first-type radio signals.

8. The first node according to claim 7, wherein the first receiver receives second information; the second information is used to indicate M1 second-type factor(s), the M1 second-type radio signal(s) is(are) respectively used to determine the M1 pathloss(es), and M1 second-type parameter(s) is(are) obtained by respectively multiplying the M1 pathloss(es) by the M1 second-type factor(s); the M1 second-type parameter(s) is(are) used to determine the K2 first-type radio signal(s); the second information is transmitted via an air interface;

or, the first receiver receives third information; the third information is used to determine M1 second-type power value(s), and the M1 second-type radio signal(s) is(are) transmitted respectively employing the M1 second-type power value(s); the third information is transmitted via an air interface.

9. The first node according to claim 3, wherein the first receiver receives first information; the first information is used to indicate K1 first-type factors, the K1 first-type radio signals are respectively used to determine K1 pathlosses, and K1 first-type parameters are obtained by respectively multiplying the K1 pathlosses by the K1 first-type factors; the K1 first-type parameters are used to determine the K2 first-type radio signal(s); the first information is transmitted via an air interface.

10. The first node according to claim 3, wherein K3 is equal to K2; the K2 first-type radio signal(s) is(are) respectively transmitted in K2 first-type reference signal resource(s), while the K3 first-type radio signal(s) is(are) respectively transmitted in K3 first-type reference signal resource(s); the K2 first-type reference signal resource(s) is(are) the same as the K3 first-type reference signal resource(s) respectively; the second signaling comprises a target bit, the target bit being used by the first node for determining whether the K3 pathloss(es) can be used to determine the first power value.

11. A third node for wireless communications, comprising:
a third transmitter, which transmits K1 first-type radio signals, the K1 first-type radio signals are Channel State Information Reference Signal (CSI-RS), K1 being a positive integer greater than 1;
a third receiver, which receives a first signaling; and
a fourth transmitter, which transmits a second signaling; wherein:
the first signaling is used to indicate K2 first-type radio signal(s) out of the K1 first-type radio signals, K2 being a positive integer no greater than the K1;
the second signaling is used to indicate K3 first-type radio signal(s) out of the K1 first-type radio signals, K3 being a positive integer no greater than the K1; the second signaling comprises K3 CSI-RS Resource Index(es) (CRI(s)), the K3 CRI(s) being respectively associated with the K3 first-type reference signal resource(s); the K3 first-type radio signal(s) respectively corresponds (correspond) to K3 Transmission Configuration Indication(s);
the first signaling is used by the third node for determining the K3 first-type radio signal(s);
the K3 first-type radio signal(s) is(are) respectively used to determine K3 pathloss(es), and the K3 pathloss(es) is(are) used to determine a first power value, a transmitting power value of a first radio signal being the first power value;
a receiver of the first radio signal includes a second node, and a transmitter of the first signaling transmits the first radio signal, the second node being non-co-located with the third node;
the K1 first-type radio signals are respectively transmitted in K1 first-type reference signal resources; and
the first signaling is used to indicate K2 first-type reference signal resource(s) out of the K1 first-type reference signal resources, while the second signaling is used to indicate K3 first-type reference signal resource(s) out of the K1 first-type reference signal resources;
the K1 first-type radio signals are transmitted respectively employing K1 first-type antenna port groups, the K1 first-type antenna port groups respectively corresponding to K1 spatial Rx parameter groups; the third node is a base station and the second node is a UE; a transmitter of the first radio signal is a first node; the first node and the second node are in communication via sidelink, and the first node and the third node are in communication via a Uu interface.

12. The third node according to claim 11, wherein:
the K3 is greater than 1, the K3 first-type radio signals respectively corresponding to K3 first-type factors, and K3 first-type parameters being obtained by respectively multiplying the K3 pathlosses by the K3 first-type factors;
a target parameter is a smallest first-type parameter of the K3 first-type parameters, and the target parameter is linear with a first reference power value, the first reference power value being used by a transmitter of the first signaling for determining the first power value;
the K1 first-type reference signal resources respectively correspond to K1 CRIs;
the first signaling comprises K2 CRI(s), the K2 CRI(s) being respectively associated with the K2 first-type reference signal resource(s).

13. The third node according to claim 11, wherein the third transmitter transmits a third signaling; the third signaling is used to determine a transmitting power value of each first-type radio signal of the K1 first-type radio signals.

14. The third node according to claim 11, wherein the third transmitter transmits first information; the first information is used to indicate K1 first-type factors, the K1 first-type radio signals are respectively used to determine K1 pathlosses, and K1 first-type parameters are obtained by respectively multiplying the K1 pathlosses by the K1 first-type factors; the K1 first-type parameters are used by the transmitter of the first signaling for determining the K2 first-type radio signal(s); the first information is transmitted via an air interface.

15. The third node according to claim 11, wherein the third transmitter transmits second information; the second information is used to indicate M1 second-type factor(s), the M1 second-type factor(s) is(are) respectively associated with M1 second-type radio signal(s), and the M1 second-type radio signal(s) is(are) respectively used to determine M1 pathloss(es), and M1 second-type parameter(s) is(are) obtained by respectively multiplying the M1 pathloss(es) by the M1 second-type factor(s); the M1 second-type parameter(s) is(are) used by the transmitter of the first signaling for determining the K2 first-type radio signal(s); a transmitter of the M1 second-type radio signal(s) is communications equipment other than the third node; the second information is transmitted via an air interface.

16. A second node for wireless communications, comprising:
a fourth receiver, which receives a first radio signal; wherein:
a first signaling is used to indicate K2 first-type radio signal(s) out of the K1 first-type radio signals, K2 being a positive integer no greater than the K1;
a second signaling is used to indicate K3 first-type radio signal(s) out of the K1 first-type radio signals, K3 being a positive integer no greater than the K1; the K1 first-type radio signals are Channel State Information Reference Signal (CSI-RS); the second signaling comprises K3 CSI-RS Resource Index(es) (CRI(s)), the K3 CRI(s) being respectively associated with the K3 first-type reference signal resource(s); the K3 first-type radio signal(s) respectively corresponds (correspond) to K3 Transmission Configuration Indication(s);

the first signaling is used by a transmitter of the second signaling for determining the K3 first-type radio signal(s);

the K3 first-type radio signal(s) is(are) respectively used to determine K3 pathloss(es); the K3 pathloss(es) is(are) used to determine a first power value, a transmitting power value of the first radio signal being the first power value;

a transmitter of the K1 first-type radio signals is a third node, the second node being non-co-located with the third node;

the K1 first-type radio signals are respectively transmitted in K1 first-type reference signal resources; and the first signaling is used to indicate K2 first-type reference signal resource(s) out of the K1 first-type reference signal resources, while the second signaling is used to indicate K3 first-type reference signal resource(s) out of the K1 first-type reference signal resources;

the K1 first-type radio signals are transmitted respectively employing K1 first-type antenna port groups, the K1 first-type antenna port groups respectively corresponding to K1 spatial Rx parameter groups; the third node is a base station and the second node is a UE; a transmitter of the first radio signal is a first node; the first node and the second node are in communication via sidelink, and the first node and the third node are in communication via a Uu interface.

17. The second node according to claim 16, wherein:

the K3 is greater than 1, the K3 first-type radio signals respectively corresponding to K3 first-type factors, and K3 first-type parameters being obtained by respectively multiplying the K3 pathlosses by the K3 first-type factors;

a target parameter is a smallest first-type parameter of the K3 first-type parameters, and the target parameter is linear with a first reference power value, the first reference power value being used by a transmitter of the first radio signal for determining the first power value;

the K1 first-type reference signal resources respectively correspond to K1 CRIs;

the first signaling comprises K2 CRI(s), the K2 CRI(s) being respectively associated with the K2 first-type reference signal resource(s).

18. The second node according to claim 16, comprising:

a fifth transmitter, which transmits M1 second-type radio signal(s), M1 being a positive integer;

wherein the M1 second-type radio signal(s) is(are) respectively used to determine M1 pathloss(es), and the M1 pathloss(es) is(are) used by a transmitter of the first radio signal for determining the K2 first-type radio signal(s) out of the K1 first-type radio signals.

19. The second node according to claim 18, wherein the fifth transmitter transmits second information; the second information is used to indicate M1 second-type factor(s), the M1 second-type radio signal(s) is(are) respectively used to determine the M1 pathloss(es), and M1 second-type parameter(s) is(are) obtained by respectively multiplying the M1 pathloss(es) by the M1 second-type factor(s); the M1 second-type parameter(s) is(are) used by a transmitter of the first radio signal for determining the K2 first-type radio signal(s); the second information is transmitted via an air interface.

20. The second node according to claim 18, wherein the fifth transmitter transmits third information; the third information is used to determine M1 second-type power value(s), and the M1 second-type radio signal(s) is(are) transmitted respectively employing the M1 second-type power value(s); the third information is transmitted via an air interface.

* * * * *